(12) United States Patent
Kim

(10) Patent No.: US 11,325,588 B2
(45) Date of Patent: May 10, 2022

(54) VEHICLE CONTROL SYSTEM AND VEHICLE CONTROL METHOD

(71) Applicant: MANDO CORPORATION, Pyeongtaek-si (KR)

(72) Inventor: Nac Dong Kim, Uiwang-si (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 204 days.

(21) Appl. No.: 16/732,980

(22) Filed: Jan. 2, 2020

(65) Prior Publication Data
US 2020/0247396 A1 Aug. 6, 2020

(30) Foreign Application Priority Data
Feb. 1, 2019 (KR) .......................... 10-2019-0013659

(51) Int. Cl.
*B60W 30/06* (2006.01)
*G06V 20/58* (2022.01)

(52) U.S. Cl.
CPC ........... *B60W 30/06* (2013.01); *G06V 20/586* (2022.01)

(58) Field of Classification Search
CPC ............. B60W 30/06; B60W 2554/20; B60W 2554/80; G08G 1/168; G08G 1/14; G08G 1/141; G08G 1/145; B62D 15/0285; G06K 9/00812; G06V 20/58; G06V 20/586
See application file for complete search history.

(56) References Cited

U.S. PATENT DOCUMENTS

| | | | |
|---|---|---|---|
| 2014/0347195 A1* | 11/2014 | Stempnik | G08G 1/14 340/932.2 |
| 2014/0365108 A1* | 12/2014 | You | B62D 15/0285 701/408 |
| 2018/0111609 A1* | 4/2018 | Woo | B60W 30/06 |
| 2020/0005649 A1* | 1/2020 | Kim | G06K 9/00812 |
| 2021/0056848 A1* | 2/2021 | Tsuge | G06K 9/00798 |

FOREIGN PATENT DOCUMENTS

| | | |
|---|---|---|
| JP | 2010-208358 A | 9/2010 |
| JP | 2017-030569 A | 2/2017 |
| KR | 10-2018-0045468 A | 5/2018 |

* cited by examiner

*Primary Examiner* — Kenneth J Malkowski
(74) *Attorney, Agent, or Firm* — Morgan, Lewis & Bockius LLP

(57) ABSTRACT

Disclosed herein is a vehicle control system and a method of controlling the vehicle. The vehicle control system includes: at least one sensor module disposed in a vehicle to have a detecting area for the inside or the outside of the vehicle, configured to capture detecting data and to process the captured detecting data; and a controller configured to park the vehicle in a recognized parking space using position coordinates of each of at least two objects based at least in part on the processing of the detecting data.

21 Claims, 17 Drawing Sheets

VEHICLE CONTROL SYSTEM AND VEHICLE CONTROL METHOD

CROSS-REFERENCE TO RELATED APPLICATION(S)

This application is based on and claims priority under 35 U.S.C. § 119 to Korean Patent Application No. 10-2019-0013659, filed on Feb. 1, 2019 in the Korean Intellectual Property Office, the disclosure of which is incorporated by reference in its entirety.

TECHNICAL FIELD

Embodiments of the disclosure relate to a vehicle control system and a method of controlling a vehicle.

BACKGROUND

A Parking Assistance System (PAS) is a system that assists parking by controlling a movement of a vehicle according to perpendicular parking, longitudinal parking, and diagonal parking conditions of a parking space.

When the parking space is formed at the perpendicular parking condition, the vehicle can park in one of front parking and rear parking. Assuming that parking is performed according to the rear parking, the PAS can park the vehicle by driving the vehicle forward of the parking space and then backing the vehicle again.

When an object is placed in the parking space during the parking process, the PAS may attempt to park by stopping backwards to avoid the object, driving the vehicle to correct a position of the vehicle and then backing the vehicle.

However, if the object accumulated in the parking space does not move, even if the vehicle is repeatedly moved forward and backward to correct the position of the vehicle, a situation may arise in which the vehicle cannot be parked in the parking space.

At this time, the PAS may provide inconvenience to a driver by repeating a forward control and a backward control, even though parking is not possible due to the object positioned in the parking space.

SUMMARY

Therefore, it is an aspect of the disclosure to provide a vehicle control system that minimizes a frequency of performing control and increases a computation speed by quickly and accurately recognizing a parking space using position coordinates, and a method of controlling the vehicle.

It is another aspect of the disclosure to provide a parking controllable vehicle control system that provides driving convenience to the driver by recognizing the parking space between an obstacle and an object using the position coordinates, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle control system includes a camera module disposed in a vehicle to have a field of view of the inside or the outside of the vehicle, configured to capture image data and to process the captured image data; at least one sensor module disposed in a vehicle to have a detecting area for the inside or the outside of the vehicle, configured to capture detecting data and to process the captured detecting data; and a controller configured to park the vehicle in a recognized parking space using position coordinates of each of at least two objects based at least in part on the processing of the image data and the detecting data. The controller is configured to determine a parking type according to states of the at least two objects obtained from a processing result of the image data and the detecting data, to calculate the position coordinates of the at least two objects, respectively and to calculate a difference value between specific components among the position coordinates of the at least two objects, to compare the difference value with a length corresponding to the parking type among preset lengths of the vehicle, and when the difference value is larger than the length of the vehicle, to recognize the difference value as the parking space and park the vehicle in the recognized parking space.

In accordance with another aspect of the disclosure, a vehicle control system includes a camera module disposed in a vehicle to have a field of view of the inside or the outside of the vehicle, configured to capture image data; at least one sensor module disposed in the vehicle to have a detecting area for the inside or the outside of the vehicle, configured to capture detecting data; a driver assistance system module configured to search for a parking space existing in the vicinity of the vehicle and to control a behavior of the vehicle for parking the vehicle in the parking space or departing the vehicle parked in the parking space; and a domain control unit (DCU) configured to process the image data and the detecting data and to control at least one of the driver assistance system modules included in the vehicle including a smart parking assistance system (SPAS) module. The DCU is configured to determine a parking type according to states of the at least two objects obtained from a processing result of the image data and the detecting data, to calculate the position coordinates of the at least two objects, respectively and calculate a difference value between specific components among the position coordinates of the at least two objects, to compare the difference value with a length corresponding to the parking type among preset lengths of the vehicle, and when the difference value is larger than the length of the vehicle, to recognize the difference value as the parking space and park the vehicle in the recognized parking space.

In accordance with another aspect of the disclosure, a method of controlling a vehicle includes capturing, by a camera module disposed in a vehicle to have a field of view of the inside or the outside of the vehicle, image data and processing the captured image data; capturing, by at least one sensor module disposed in the vehicle to have a detecting area for the inside or the outside of the vehicle, detecting data and processing the captured detecting data; and parking, by a controller, the vehicle in a recognized parking space using position coordinates of each of at least two objects based at least in part on the processing of the image data and the detecting data. The parking of the vehicle may include determining a parking type according to states of the at least two objects obtained from a processing result of the image data and the detecting data, calculating the position coordinates of the at least two objects, respectively and calculate a difference value between specific components among the position coordinates of the at least two objects, comparing the difference value with a length corresponding to the parking type among preset lengths of the vehicle, and when the difference value is larger than the length of the vehicle, recognizing the difference value as the parking space and park the vehicle in the recognized parking space.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. It will be understood that, although the terms first, second, A, B, (a), (b) etc. may be used herein to describe various components, these components should not be limited by these terms. These terms are only used to distinguish one component from another. For example, without departing from the scope of the disclosure, the first component may be referred to as a second component, and similarly, the second component may also be referred to as a first component. Throughout this specification, when a portion is connected to another portion, this includes the case in which the portion is indirectly connected to the other portion, as well as the case in which the portion is directly connected to the other portion, and the indirect connection includes a connection through a wireless communication network.

The vehicle in the present specification may be a concept including an automobile, a motorcycle, and the like. In addition, the vehicle may be a concept including an internal combustion engine vehicle having an engine as a power source, a hybrid vehicle having an engine and an electric motor as a power source, and an electric vehicle having an electric motor as a power source. In the following description, the vehicle is mainly described as an automobile.

In the following description, the front indicates the forward driving direction of the vehicle, and the rear indicates the backward driving direction of the vehicle. The left side of the vehicle indicates the left side of the forward driving direction of the vehicle, and the right side of the vehicle indicates the right side of the forward driving direction of the vehicle. In addition, the rear side of the vehicle indicates the left or the right side with respect to the backward driving direction of the vehicle.

Figure 1:
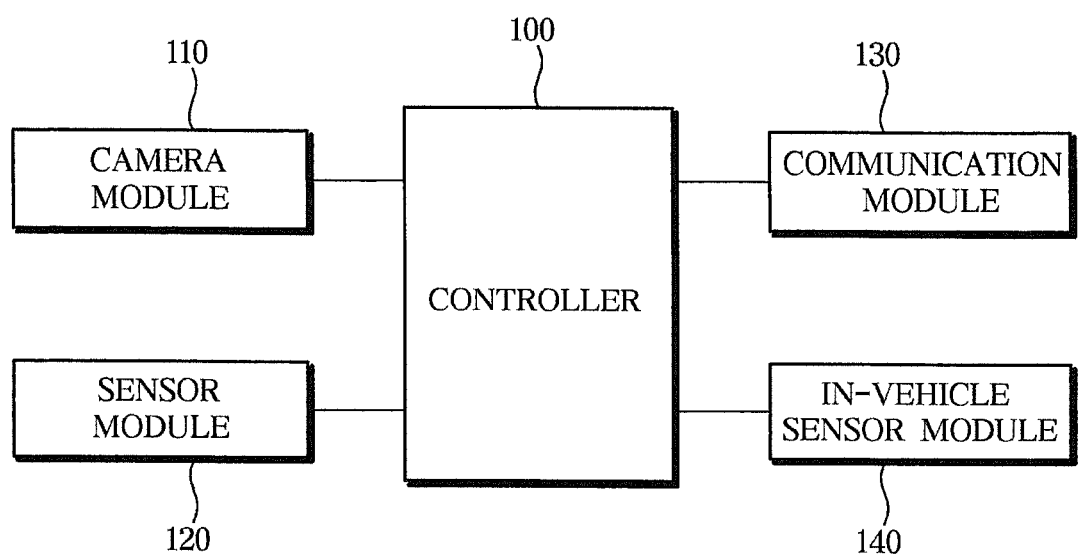
FIG. 1 is a view illustrating an embodiment of a vehicle control system according to the disclosure.

FIG. 1 is a view illustrating an embodiment of a vehicle control system according to the disclosure;

Referring to FIG. 1, a vehicle control system may include a controller 100, a camera module 110, a sensor module 120, a communication module 130, an in-vehicle sensor module 140, and the like.

For example, the camera module 110 may include an image sensor configured to have a field of view of the inside or the outside of the vehicle to capture image data, and a processor configured to process the captured image data.

As an example, the image sensor may be disposed in the vehicle to have the field of view of the inside or the outside of the vehicle. At least one image sensor may be mounted to each part of the vehicle to have a field of view of the front, the sides or the rear of the vehicle.

Because image information photographed by the image sensor is composed of image data, the image information may refer to image data captured by the image sensor. Hereinafter in the disclosure, image information photographed by the image sensor may refer to image data photographed by the image sensor. The image data captured by the image sensor may be generated, for example, in one of AVI, MPEG-4, H.264, DivX, and JPEG in raw form.

The image data captured in the image sensor may be processed in the processor. The processor may operate to process the image data captured by the image sensor.

The processor may be implemented in hardware using at least one of electrical units capable of processing the image data and performing and other functions such as application specific integrated circuits (ASICs), digital signal processors (DSPs), digital signal processing devices (DSPDs), programmable logic devices (PLDs), field programmable gate arrays (FPGAs), controllers, micro-controllers, and microprocessors.

The sensor module 120 may refer to another sensor module except for the camera module 110 which captures an image. For example, a plurality of the non-image sensor modules 120 may be disposed in the vehicle to have a detecting area for the inside or the outside of the vehicle, thereby capturing detecting data. Examples of the plurality of non-image sensor modules 120 include a radar sensor, a lidar sensor, an ultrasonic sensor, and the like. The sensor module 120 may not be provided or may be provided with one or more.

When the sensor module 120 is an ultrasonic sensor, the ultrasonic sensor may include an ultrasonic transmitter, a receiver, and the processor. The ultrasonic sensor may detect an object based on the transmitted ultrasonic waves, and detect a distance and a relative speed with the detected object. When the object is a stationary object (e.g., roadside street, street light, traffic light, traffic sign, etc.), the ultrasonic sensor may detect a distance between the vehicle and the object and a driving speed of the vehicle based on a time of flight (TOF) by the object.

The communication module 130 functions to perform vehicle-to-vehicle communication, vehicle-to-infrastructure communication, vehicle-to-server communication, in-vehicle communication, and the like. To this end, the communication module 130 may be composed of a transmitting module and a receiving module. For example, the communication module 130 may include a broadcast receiving module, a wireless internet module, a short range communication module, a position information module, an optical communication module, a V2X communication module, and the like.

The broadcast receiving module receives a broadcast signal or broadcast related information from an external broadcast management server through a broadcast channel. The broadcast includes at least one of radio broadcast and TV broadcast. The wireless internet module may refer to a module for wireless internet access and may be mounted on the inside or the outside of the vehicle. The short range communication module, which is for short range communication, may support short-range communication using at least one of Bluetooth™ technology, RFID (Radio Frequency Identification) technology, IrDA (Infrared Data Association) technology, UWB (Ultra-Wideband) technology, ZigBee technology, NFC (Near Field Communication) technology, Wi-Fi (Wireless-Fidelity) technology, Wi-Fi Direct technology, and USB (Wireless Universal Serial Bus) technology.

The position information module is a module for obtaining position information of a vehicle, and a representative example thereof is a GPS (Global Positioning System) module. For example, when a vehicle utilizes a GPS module, the vehicle may acquire the position of the vehicle using a signal transmitted from a GPS satellite. According to an embodiment, the position information module is not a component included in the communication module 130, but may be a component included in the in-vehicle sensor module 140.

The optical communication module may include an optical transmitter and an optical receiver. The light transmitter and the light receiver may convert a light signal into an electrical signal to transmit and receive information.

The V2X communication module is a module for performing wireless communication with a server or another vehicle, an infrastructure device, or the like. The V2X communication module in the present embodiment means a device or a technology that allows a vehicle to exchange information with other vehicles, mobile devices, roads, and the like through a wired or wireless network. The V2X communication module may be a concept including V2V (vehicle to vehicle), V2I (vehicle to infrastructure), V2N (vehicle to nomadic device), and V2P (vehicle to pedestrian). The V2X communication module is based on dedicated short-range communications (DSRC), and may use the WAVE (Wireless Access in Vehicular Environment) which was recently conducted by the Institute of Electrical and Electronics Engineers (IEEE) or use the IEEE 802.11p communication technology using the 5.9 GHz band, but is limited thereto, and it should be understood that the V2X communication module includes all inter-vehicle communications that will be developed now or in the future.

The in-vehicle sensor module 140 may refer to a sensor for detecting vehicle interior information. For example, the in-vehicle sensor module 140 may refer to a torque sensor for detecting a steering torque, a steering angle sensor for detecting a steering angle, a motor position sensor for detecting information on a steering motor, a vehicle speed sensor, a vehicle motion sensor for detecting the movement of a vehicle, a vehicle attitude sensor, a height sensor for detecting a vehicle height, a tire pressure sensor, and the like. In addition, the in-vehicle sensor module 140 may refer to a sensor for detecting various data in the vehicle, and may be configured as one or more sensors.

The controller 100 may obtain data from at least one of the camera module 110, the sensor module 120, the communication module 130, and the in-vehicle sensor module 140 and control various operations of the vehicle based on the obtained data. The controller 100 may also obtain image data from the camera module 110 and process the image data. The controller 100 may also receive detecting data from the sensor module 120 and process the detecting data. In addition, the controller 100 may obtain data from the in-vehicle sensor module 140 or the communication module 130 and process the obtained data. For this processing, the controller 100 may include at least one processor.

The vehicle control system may be implemented by combining the above configurations as necessary. For example, the vehicle control system may include the camera module 110, the sensor module 120, and the controller 100. In another example, the vehicle control system may include the camera module 110 and the controller 100. As another example, the vehicle control system may include the sensor module 120 and the controller 100. However, it is not limited thereto.

Particularly, the vehicle control system may include at least one sensor module 120 disposed in the vehicle to have the detecting area for the inside or the outside of the vehicle and configured to capture the detecting data and process the captured detecting data, and the controller 100 configured to park the vehicle in a recognized parking space using position coordinates of each of the at least two objects based at least in part on the processing of the detecting data.

The controller 100 may determine a parking type according to states of the at least two objects obtained from a processing result of the detecting data, calculate the position coordinates of the at least two objects, respectively, calculate a difference value between specific components among the position coordinates of the at least two objects, compare the difference value with a length corresponding to the parking type among preset lengths of the vehicle. When the difference value is larger than the length of the vehicle, the controller 100 may recognize the difference value as the parking space and park the vehicle in the recognized parking space.

Herein, the parking type may include perpendicular parking, longitudinal parking, diagonal parking, and the like, and may be determined according to a state indicating an arrangement, shape, and the like of the object.

For example, when the object is another vehicle, the controller 100 may identify the parking type of another vehicle obtained by the processing result of the detecting data. When the front or rear surface of another vehicle is identified or the detected length is less than or equal to a preset distance, the controller 100 may determine the parking type as the perpendicular parking. When the side of another vehicle is identified or the detected length exceeds the preset distance, the controller 100 may determine the parking type as the longitudinal parking. When another vehicle is parked at a constant angle with the vehicle, the controller 100 may determine the parking type as the diagonal parking. However, the disclosure is not limited thereto, and the above description may be equally applicable to the case where the object is a wall surface.

Herein, the position coordinates of the object may be two-dimensional coordinates preferably including an x component and a y component (or a longitudinal component and a transverse component), but are not limited thereto. In addition, the position coordinates of the object may be expressed in local coordinates, world coordinates, and the like. However, it is not limited thereto.

Herein, the controller 100 may calculate position coordinates of the object by using a detection point at which the distance between the sensor module and the object is minimum among a plurality of detection points obtained from the processing result of the detecting data.

The controller 100 may calculate the difference value between the specific components, such as the x component or the y component (or the longitudinal component or the transverse component) among the position coordinates of the object, and compare the difference with the length of the vehicle corresponding to the parking type.

For example, when the parking type is determined as the perpendicular parking, the controller 100 may compare the difference value with a transverse length of the vehicle corresponding to the perpendicular parking. In other words, when the parking type is the perpendicular parking, the controller 100 may calculates the difference value between the transverse components of the position coordinates of the object and compare a width of the vehicle corresponding to the transverse length of the vehicle corresponding to the perpendicular parking.

As another example, when the parking type is determined as the longitudinal parking, the controller 100 may compare the difference with a longitudinal length of the vehicle corresponding to the longitudinal parking. In other words, when the parking type is the longitudinal parking, the controller 100 may calculate the difference value between the longitudinal components of the position coordinates of the object and compare an overall length of the vehicle corresponding to the longitudinal length of the vehicle corresponding to the longitudinal parking.

The controller 140 may be implemented using an electronic controller unit (ECU), a micro controller unit (MCU), or the like.

In addition, the controller 100 may control the operation of at least one of the camera module 110, the sensor module 120, the communication module 130, and the in-vehicle sensor module 140. The controller 100 may also control the operation of various driver assistance systems provided in the vehicle.

On the other hand, it may be implemented as a domain control unit (DCU) capable of performing all functions of controlling the vehicle by outputting the functions of the above-described processor, the operation of the controller 100, a steering control module, a braking control module, an Adaptive Driving Assistance System (ADAS) module, etc.

Herein, the ADAS module may indicate that a plurality of driver assistance systems are implemented as a module. Examples of the driver assistance systems may include a smart parking assistance system (SPAS), a blind spot detection (BSD). System, an Adaptive Cruise Control (ACC) system, a Lane Departure Warning System (LDWS), a Lane Keeping Assist System (LKAS), a Lane Change Assist System (LCAS), etc. However, it is not limited thereto.

Figure 2:
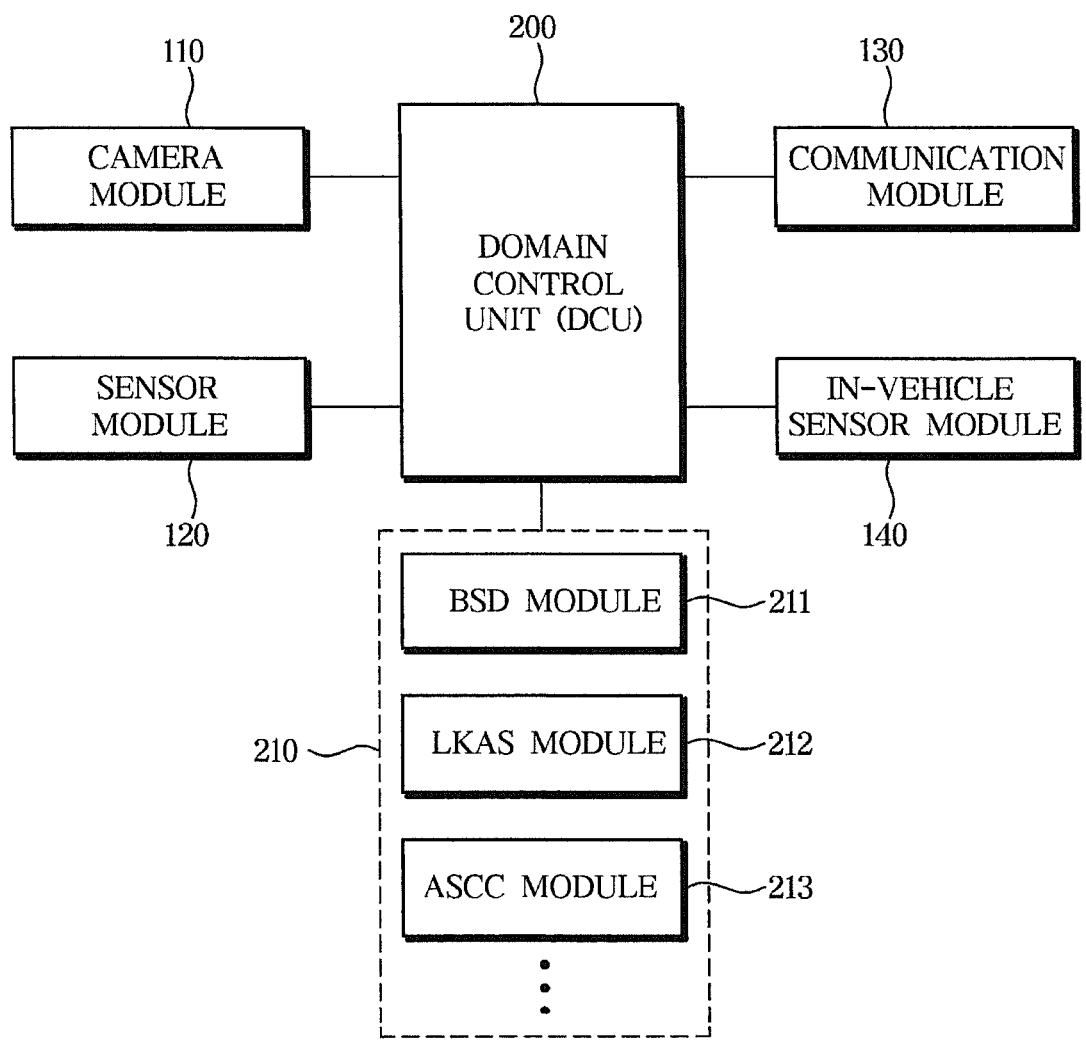
FIG. 2 is a view illustrating another embodiment of a vehicle control system according to the disclosure.

FIG. 2 is a view illustrating another embodiment of a vehicle control system according to the disclosure.

Referring to FIG. 2, the vehicle control system may be configured to include at least one of the camera module 110, the sensor module 120, the communication module 130, and the in-vehicle sensor module 140. Description thereof has been described with reference to FIG. 1 and thus will be omitted.

The vehicle control system may also include a domain control unit (DCU) 200. The DCU 200 may be configured to process at least one of the image data and the detecting data by receiving the image data captured from at least one image sensor and receiving the detecting data captured from a plurality of non-image sensors. For this processing, the DCU 200 may include at least one processor.

In addition, the DCU 200 may transmit and receive data with at least one of the camera module 110, the sensor module 120, the communication module 130, the in-vehicle sensor module 140 and driver assistance system modules 210 and process data received therethrough. That is, the DCU 200 may be provided in a vehicle and communicate with at least one module mounted in the vehicle. To this end, the DCU 200 may further include a suitable data link or communication link such as a vehicle network bus for data transmission or signal communication.

The DCU 200 may operate to control one or more of the various driver assistance systems (DAS) used in the vehicle. For example, the DCU 200 is may determine a specific situation, condition, event occurrence, performance of a control operation, and the like based on data obtained from at least one of the camera module 110, the sensor module 120, the communication module 130, the in-vehicle sensor module 140 and the driver assistance system modules 210.

The DCU 200 may transmit a signal for controlling the operation of various modules of the driver assistance system modules 210 provided in the vehicle by using the determined information and the like. For example, the driver assistance system modules 210 may include a blind spot detection (BSD) system module 211, a lane keep assist system (LKAS) module 212, an adaptive smart cruise control (ASCO) system module 213, and the like. In addition, the driver assistance system modules 210 provided in the vehicle may exist in various ways such as the LDWS, the LCAS, a parking assistance system (PAS), and the like. The terms and names of the driver assistance systems described herein are disclosed by way of example and not limited thereto. In addition, the driver assistance system modules 210 may include an autonomous driving module for autonomous driving. Alternatively, the DCU may control the vehicle to perform autonomous driving through control of the individual system modules included in the driver assistance system modules 210.

As described above, the vehicle control system may be implemented by combining the above configurations as necessary. For example, the vehicle control system may include the camera module 110 disposed in the vehicle to have the field of view of the inside or the outside of the vehicle and configured to capture the image data, the sensor module 120 disposed in the vehicle to have the detecting area for the inside or the outside of the vehicle and configured to capture the detecting data, the driver assistance system modules 210 configured to search for the parking space existing in the vicinity of the vehicle and to control a behavior of the vehicle for parking the vehicle in the parking space or departing the vehicle parked in the parking space, and the DCU 200 configured to process the image data and the detecting data and to control at least one of the driver assistance system modules 200 included in the vehicle including the SPAS module.

Herein, the DCU 200 may determine the parking type according to the states of the at least two objects obtained from the processing result of the image data and the detecting data, calculate the position coordinates of the at least two objects, respectively, calculate the difference value between the specific components among the position coordinates of the at least two objects, compare the difference value with a length corresponding to the parking type among preset lengths of the vehicle. When the difference value is larger than the length of the vehicle, the DCU 200 may recognize the difference value as the parking space and park the vehicle in the recognized parking space.

Figure 3:
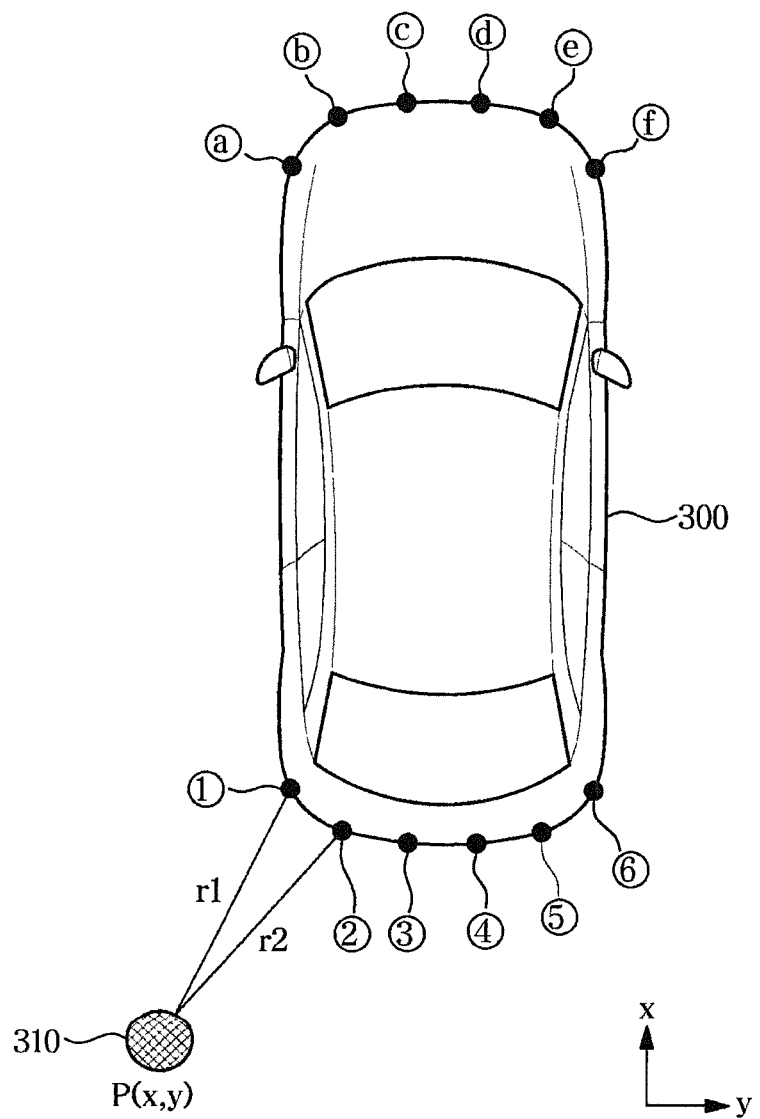
FIG. 3 is a view for describing embodiments in which a sensor module is disposed in a vehicle according to the disclosure.

FIG. 3 is a view for describing embodiments in which a sensor module is disposed in a vehicle according to the disclosure.

Referring to FIG. 3, the sensor module 120 may be disposed at each of the front and the rear of a vehicle 300, and a plurality of non-image sensor modules 120 may be disposed at the front or the rear of the vehicle 300.

For example, the non-image sensor modules 120 may be arranged in the front (ⓐ to ⓕ) of the vehicle 300 by six, and may be arranged at the rear (① to ⑥) of the vehicle 300 by six. The arrangement and number of the sensor module 120 described above are not limited to those illustrated in FIG. 3.

When the sensor module 120 is disposed outside the vehicle 300, the sensor module 120 may detect a detecting object 310 existing in the vicinity of the vehicle 300, and the controller 100 may calculate the position coordinates of the detecting object 310.

For example, when the sensor module 120 is the ultrasonic sensor, a first ultrasonic sensor ① to a sixth ultrasonic sensor ⑥ are disposed at the rear of the vehicle 300 in a local coordinate plane.

Then, it is assumed that an ultrasonic signal transmitted from the first ultrasonic sensor ① is reflected through the detecting object 310 and half of a time taken until the reflected ultrasonic signal is received by the first ultrasonic sensor ① again is a first time t1. It is assumed that the ultrasonic signal transmitted from the second ultrasonic sensor ② is reflected through the detecting object 310, and a time obtained by subtracting the first time from the time taken until the reflected ultrasonic signal is received by the first ultrasonic sensor ① is a second time t2.

Next, the controller 100 may calculate a first distance r1 to the detecting object 310 centering on the first ultrasonic sensor ① by multiplying a speed of the ultrasonic waves (about 330 m/s) by the first time t1 and form a circle having a radius of the first distance r1. Similarly, the controller 100 may calculate a second distance r2 by multiplying the speed of the ultrasonic waves by the second time t2 and form the circle having the radius of the second distance r2.

Then, the controller 100 may generate the two circles described above based on the position coordinates of each of the first ultrasonic sensor ① and the second ultrasonic sensor ②, and may calculate two intersections generated by the two circles using an equation of the circle.

Next, the controller 100 may select the position coordinates positioned at the outside of the vehicle 300, for example, local coordinates and set the selected position coordinates as the position coordinates of the detecting object 310.

Although the above-described example has been described using the first ultrasonic sensor ① and the second ultrasonic sensor ②, the position coordinates of the detecting object 310 may be equally calculated using a third ultrasonic sensor ③ to a sixth ultrasonic sensor ⑥, and the position coordinates of the detecting object 310 may be equally calculated using another sensor module 120 disposed in front of the vehicle 300.

On the other hand, the above example is also applicable to the case that the sensor module 120 is the radar sensor, a lidar sensor. Therefore, hereinafter, for convenience of description, the plurality of non-image sensor modules 120 will be described based on the ultrasound.

As described above, the disclosure may control to park the vehicle 300 in the recognized parking space by determining the parking type and recognizing the parking space using position coordinates of the object. Hereinafter, an embodiment according to the parking type will be described, but for convenience, a plurality of objects will be described as being other vehicles. However, the disclosure is not limited thereto, and the same may be applied to the case where the object is the wall surface.

Figure 4:
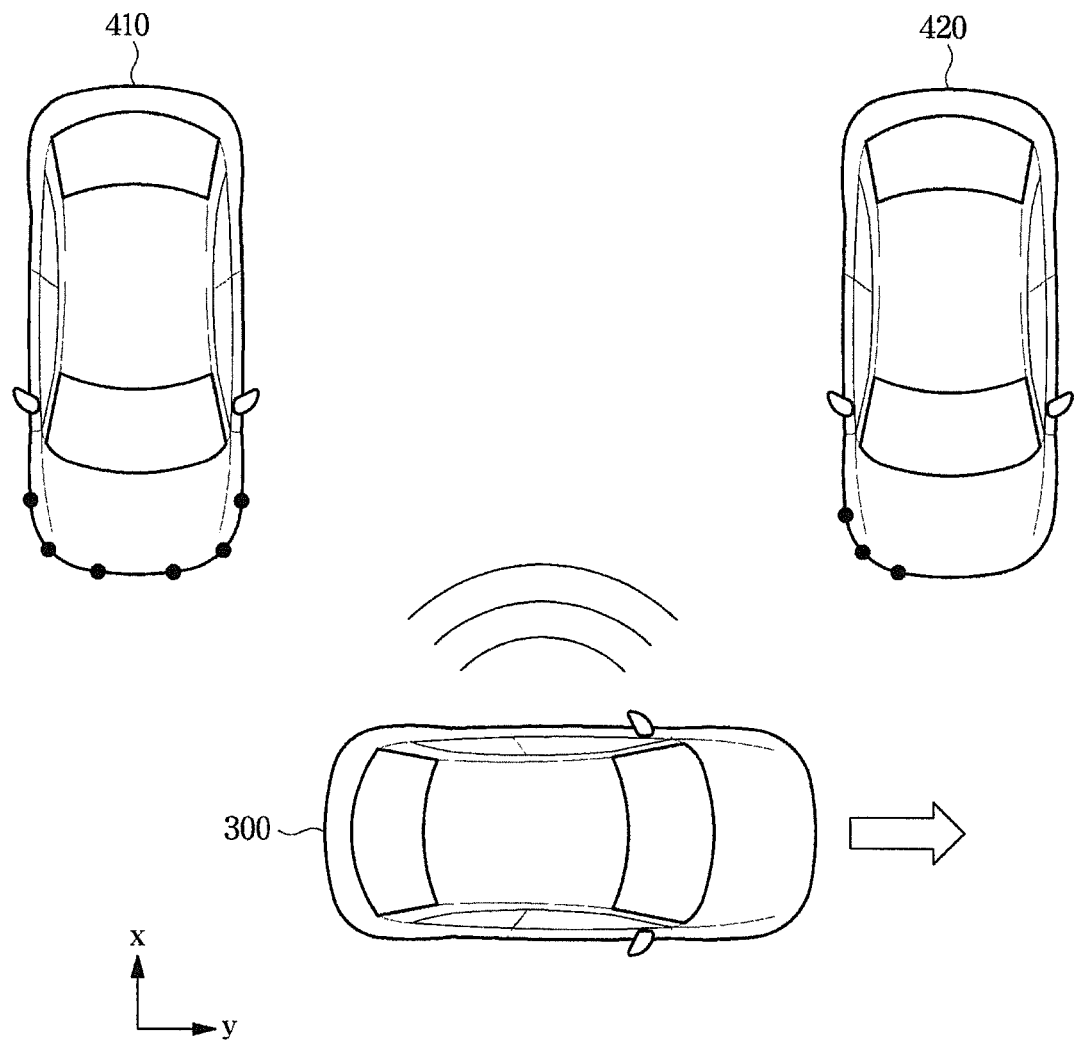
FIG. 4 is a view for describing embodiments in which perpendicular parking is determined according to the disclosure.

FIG. 4 is a view for describing embodiments in which perpendicular parking is determined according to the disclosure.

Referring to FIG. 4, the perpendicular parking may refer to a case where a first vehicle 410 and a second vehicle 420 are parked such that side surfaces of the vehicles are parallel to each other.

When the driver in the vehicle 300 operates to perform the driver assistance system, for example, a SPAS function, after the sensor module 120 detects the objects existing in the vicinity of the vehicle 300 while the vehicle 300 slows down in a specific direction, and the controller 100 may determine the parking type.

In this case, the plurality of non-image sensor modules 120 disposed in the vehicle 300 may detect one surface of the first vehicle 410, for example, the front of the first vehicle 410 for a predetermined time while the vehicle 300 slows down in the specific direction, for example, a y-axis direction, and the controller 100 may identify the detected time and compare the detected time with a preset detection condition.

After the first vehicle 410 is detected, when the vehicle 300 continues to move and passes an area where no the object exists in the vicinity of the vehicle 300, the plurality of non-image sensor modules 120 do not detect for the predetermined time, and the controller 100 may identify the undetected time and compare the undetected time with a preset undetected condition.

Next, the plurality of non-image sensor modules 120 may detect one surface of the second vehicle 420, for example, the front of the second vehicle 420 for the predetermined time, and the controller 100 may identify the detected time and compare the detected time with the preset detection condition.

The controller 100 may determine the parking type as the perpendicular parking by combining the preset detection condition and undetected condition.

Figure 5:
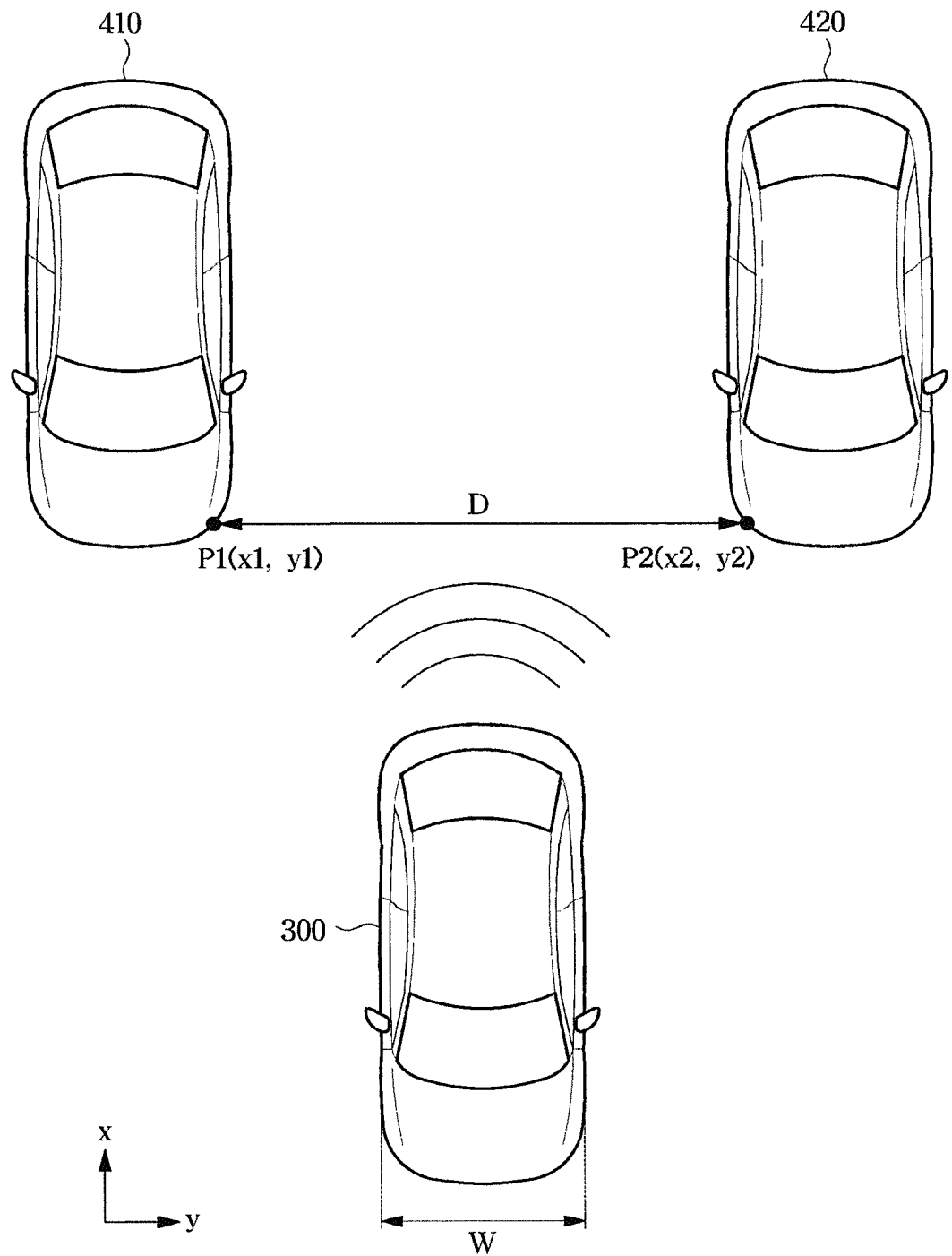
FIG. 5 is a view for describing an embodiment in which a parking space is recognized during perpendicular parking according to the disclosure.

FIG. 5 is a view for describing an embodiment in which a parking space is recognized during perpendicular parking according to the disclosure.

Referring to FIGS. 4 and 5, when the parking type is determined to be the perpendicular parking, the controller 100 may calculate the position coordinates of each of the first vehicle 410 and the second vehicle 420.

For example, the plurality of non-image sensors 120, that is, a plurality of ultrasonic sensors disposed at the rear of the vehicle 300 may detect a corner in front of the first vehicle 410 and a corner in front of the second vehicle 420. The controller 100 may calculate a first position coordinates P1 of the first vehicle 410 and a second position coordinates P2 of the front of the second vehicle 420.

Then, the controller 100 may calculate the difference value between the specific components of the position coordinates. For example, the controller 100 may extract y1 and y2, which are the y components of each of the first position coordinates P1 and the second position coordinates P2, and calculate a difference value D corresponding to the difference between the y components.

Then, the controller 100 may compare the difference value D with the length of the vehicle 300 corresponding to the parking type. For example, the controller 100 may compare the difference value D with a transverse length W of the vehicle 300 corresponding to the determined perpendicular parking.

When the difference value D is greater than the transverse length W, the controller 100 may recognize the difference value D as the parking space and control the behavior of the vehicle 300 to park the vehicle 300 in the recognized parking space.

In this case, when the parking space is recognized, the controller 100 may determine that parking is completed when an entry rate of the vehicle 300 with respect to the recognized parking space is equal to or greater than a preset reference entry rate.

Herein, the entry rate is a value calculated using an entry position of the vehicle 300 relative to a depth of the parking space. When the entry rate is 100%, it indicates that the vehicle 300 has entered the end of the parking space.

Meanwhile, there may be a case where parking is difficult because the obstacle exists in the recognized parking space. In this case, it is necessary to recognize an optimal parking space by comparing an interval between each of the other vehicles 410 and 420 and the obstacle.

Figure 6:
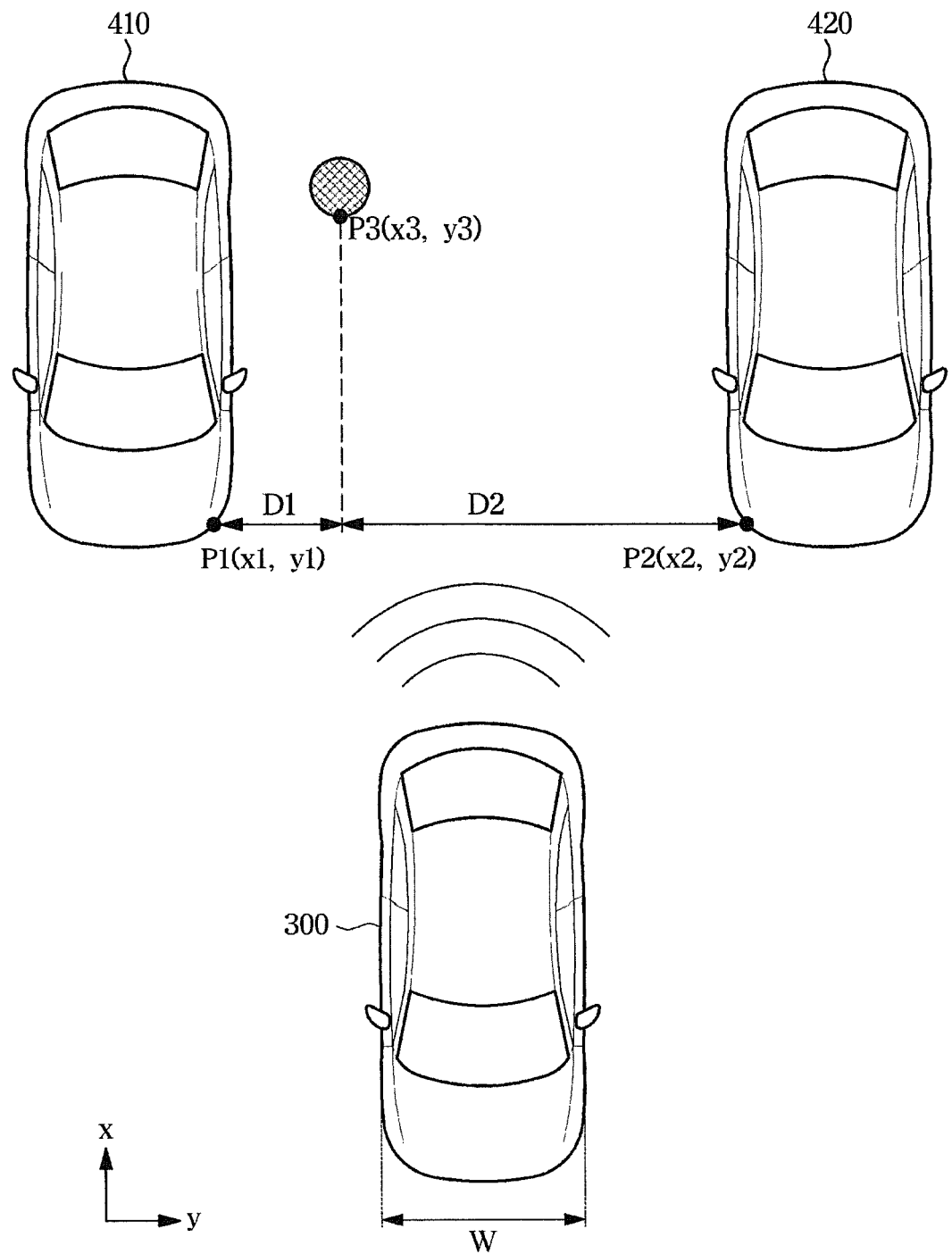
FIG. 6 is a view for describing another embodiment in which a parking space is recognized during perpendicular parking according to the disclosure.

FIG. 6 is a view for describing another embodiment in which a parking space is recognized during perpendicular parking according to the disclosure.

Referring to FIGS. 3 to 6, the controller 100 may determine the parking type to be the perpendicular parking, and calculate the first position coordinates P1 of the first vehicle 410 and the second position coordinates P2 of the second vehicle 420. Since the detailed method is the same as the above-mentioned, it is omitted.

When there is the obstacle between the first vehicle 410 and the second vehicle 420, the sensor module 120 disposed in the vehicle 300 may capture the detecting data including the obstacle.

For example, the plurality of ultrasonic sensors may transmit the ultrasonic signal and receive the ultrasonic signal reflected from the obstacle 430 to detect the obstacle 430.

When the controller 100 confirms the obstacle existing between two objects from the processing result of the detecting data, the controller 100 may calculate the position coordinates of the obstacle.

For example, the controller 100 may calculate a third position coordinates P3 of the obstacle 430 existing between the first vehicle 410 and the second vehicle 420 as illustrated in FIGS. 4 and 5.

In addition, the controller 100 may calculate a first difference value between a first position coordinates of a first object of the two objects and the specific component of the position coordinates of the obstacle and a second difference value between a second position coordinates of a second object of the two objects and the specific component of the position coordinates of the obstacle.

For example, the controller 100 may extract y1 and y3, which are the y components of each of the first position coordinates P1 of the first vehicle 410 and the third position coordinates P3 of the obstacle 430, and calculate a first difference value D1 corresponds to the difference between the y components. In addition, the controller 100 may extract y2 and y3, which are the y components of each of the second position coordinates P2 of the second vehicle 420 and the third position coordinates P3 of the obstacle 430, and calculate a second difference value D2 corresponds to the difference between the y components.

Next, the controller 100 may recognize the difference value larger than the length of the vehicle 300 that is preset in corresponding to the parking type among the first difference value D1 and the second difference value D2 as the parking type.

That is, when the parking type is determined to be the perpendicular parking, the controller 100 may recognize the difference value larger than the transverse length W of the vehicle 300 as the parking space among the first difference value D1 and the second difference value D2.

For example, the controller 100 may recognize the second difference value D2 greater than the transverse length W of the vehicle 300 corresponding to the perpendicular parking among the first difference value D1 and the second difference value D2 as the parking space.

When the parking space is recognized, the controller 100 may control the behavior of the vehicle 300 to park the vehicle 300 in the parking space recognized as described above with reference to FIG. 5.

Figure 7:
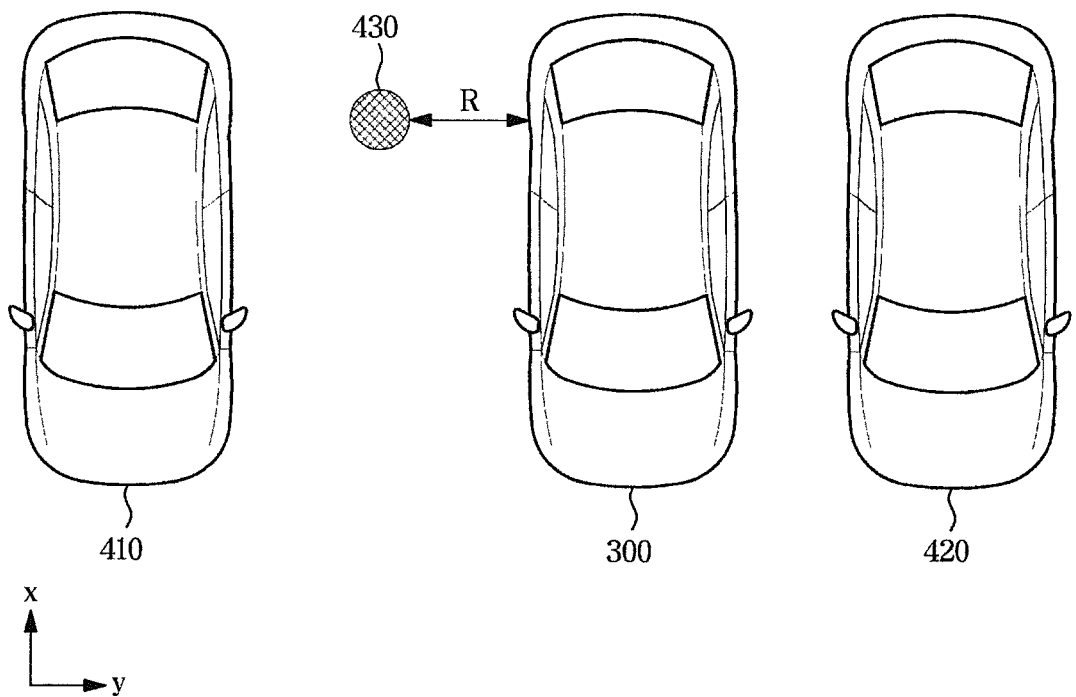
FIG. 7 is a view for describing an embodiment in which perpendicular parking is completed according to the disclosure.
Figure 8:
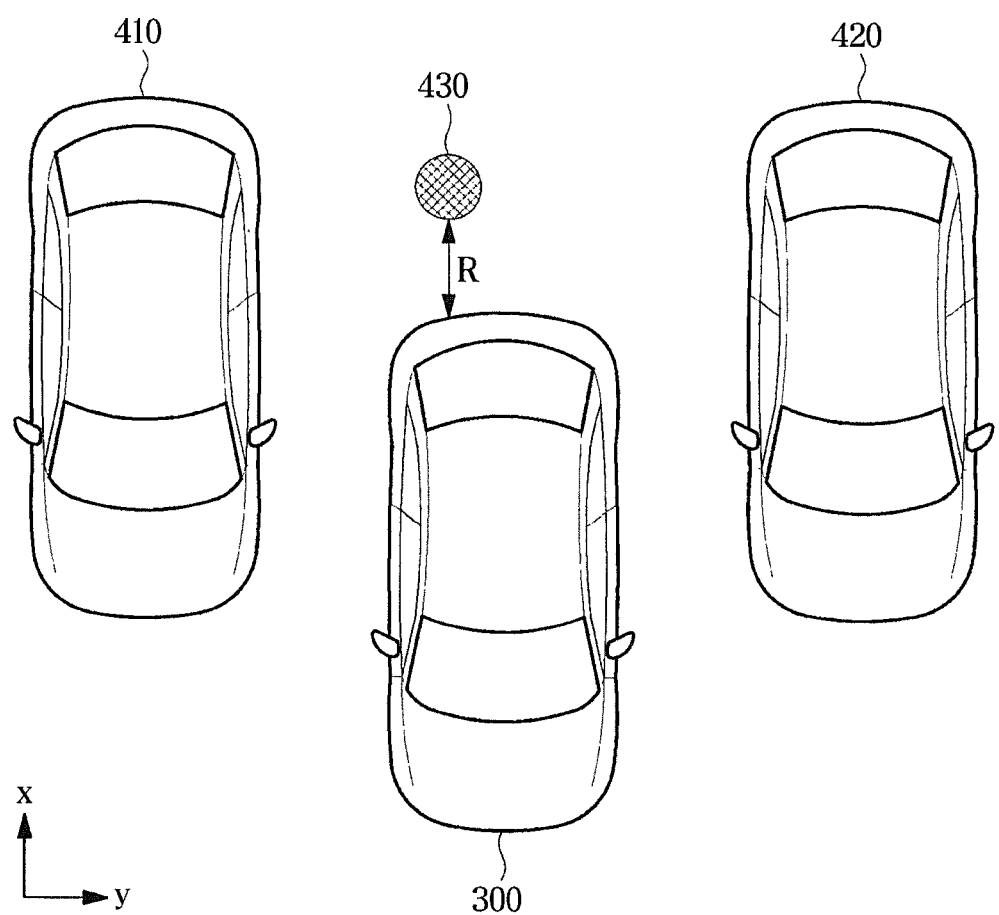
FIG. 8 is a view for describing another embodiment in which perpendicular parking is completed according to the disclosure.

FIG. 7 is a view for describing an embodiment in which perpendicular parking is completed according to the disclosure, and FIG. 8 is a view for describing another embodiment in which perpendicular parking is completed according to the disclosure.

Referring to FIGS. 6 and 7, when the parking space is recognized, the controller 100 may determine that parking is completed when the entry rate of the vehicle 300 with respect to the recognized parking space is equal to or greater than the preset reference entry rate, and the interval between the obstacle 430 and the vehicle 300 satisfies a preset reference interval.

For example, the controller 100 may recognize the second difference value D2 as the parking space, as illustrated in FIG. 6, and control the behavior of the vehicle 300 so that the vehicle 300 moves backward to the parking space corresponding to the second difference value D2. When the entry rate of the vehicle 300 with respect to the recognized parking space is 85% or more of the reference entry rate, and the interval between the obstacle 430 and the right side of the vehicle 300 satisfies a reference interval R, the controller 100 may determine that parking in the recognized parking space is completed.

On the other hand, a passenger in the vehicle 300 by the obstacle 430 may feel uncomfortable to get off. In this case, the parking position different from that illustrated in FIG. 6 is required.

Referring to FIGS. 7 and 8, the controller 100 may determine whether parking space selection information is received. Upon receiving the parking space selection information, the controller 100 may select one of the recognized first parking space based on the position coordinates of the two objects based on the received parking space selection information and the recognized second parking space based on the difference value greater than the preset length of the vehicle 300 corresponding to the parking type.

Herein, the parking space selection information may refer to a command signal generated by the driver using a mobile communication terminal or an operation button disposed in the vehicle 300.

Referring to FIGS. 5 and 8, for example, when the driver generates the parking space selection information by operating an input button to select the first parking space corresponding to the difference value D illustrated in FIG. 5, the controller 100 may select the first parking space corresponding to the difference value D illustrated in FIG. 5, and control the vehicle 300 so that the vehicle 300 moves backward to the first parking space. When the entry rate of the vehicle 300 with respect to the recognized first parking space is 85% or more of the reference entry rate, and the interval between the obstacle 430 and the rear of the vehicle 300 satisfies the reference interval R, the controller 100 may determine that parking in the recognized first parking space is completed.

As described above, in the perpendicular parking, the parking space can be recognized using the position coordinates of the object and the transverse length W of the vehicle 300. Hereinafter, embodiments related to the longitudinal parking will be described.

Figure 9:
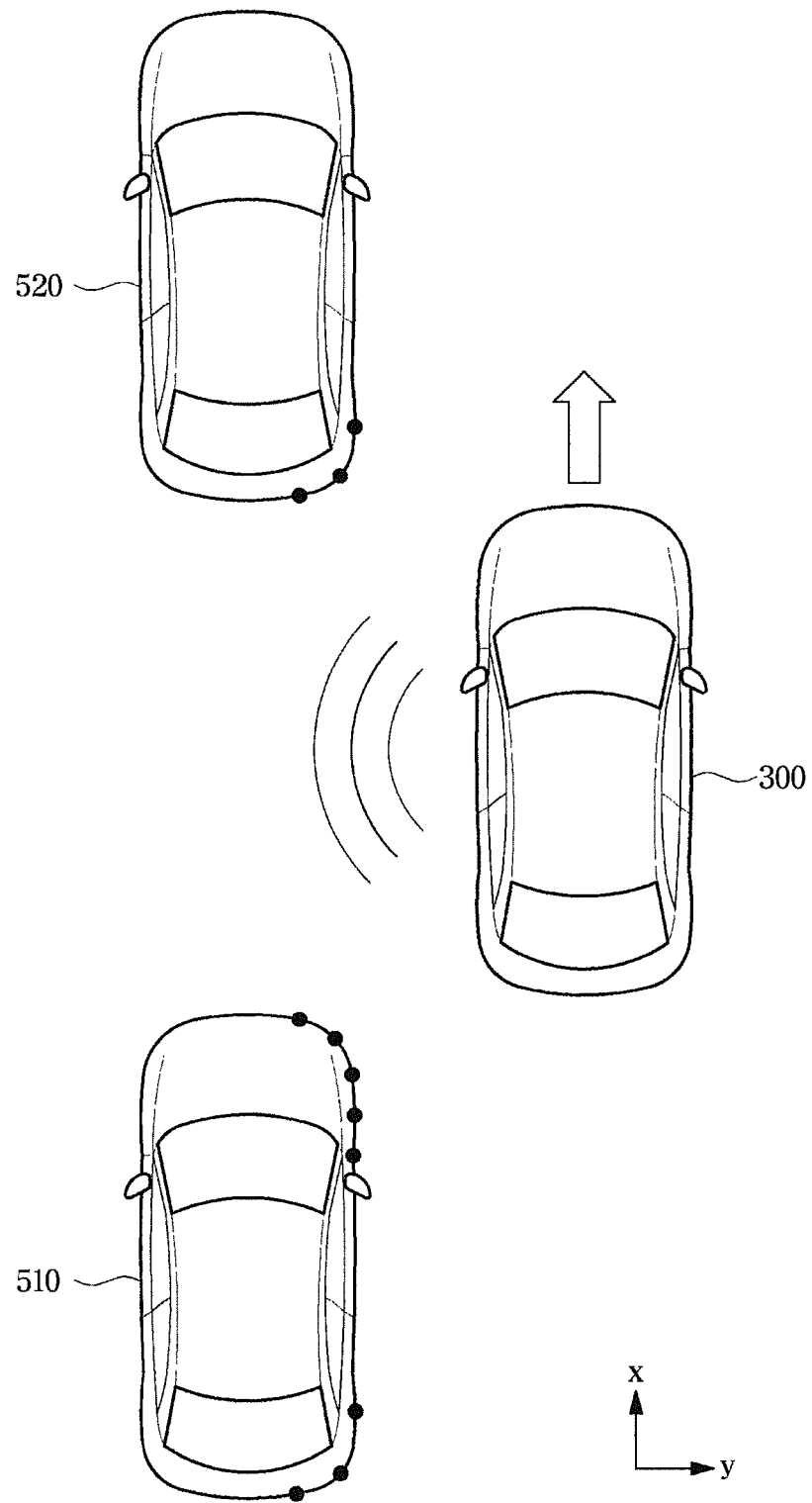
FIG. 9 is a view for describing embodiments in which longitudinal parking is determined according to the disclosure.

FIG. 9 is a view for describing embodiments in which longitudinal parking is determined according to the disclosure.

Referring to FIG. 9, the longitudinal parking may refer to a case where a first vehicle 510 and a second vehicle 520 are parked such that the front or rear of each of the vehicles is aligned in a straight line.

When the driver in the vehicle 300 operates to perform the driver assistance system, for example, the SPAS function, after the sensor module 120 detects the objects existing in the vicinity of the vehicle 300 while the vehicle 300 slows down in the specific direction, and the controller 100 may determine the parking type.

In this case, the plurality of non-image sensor modules 120 disposed in the vehicle 300 may detect one surface of the first vehicle 410, for example, the front of the first vehicle 410 for a predetermined time while the vehicle 300 slows down in the specific direction, for example, a y-axis direction, and the controller 100 may identify the detected time and compare the detected time with a preset detection condition.

In this case, as illustrated in FIG. 4, the plurality of non-image sensor modules 120 disposed in the vehicle 300 may detect the side surface of the first vehicle 510 for the predetermined time and then do not detect for the predetermined time, and then detect the side surface of the second vehicle 520 for the predetermined time while the vehicle 300 slows down in the specific direction, for example, a x-axis direction. The controller 100 may determine the parking type as the longitudinal parking by identifying the detected time or the undetected time and comparing it with the preset detection condition or undetected condition.

Figure 10:
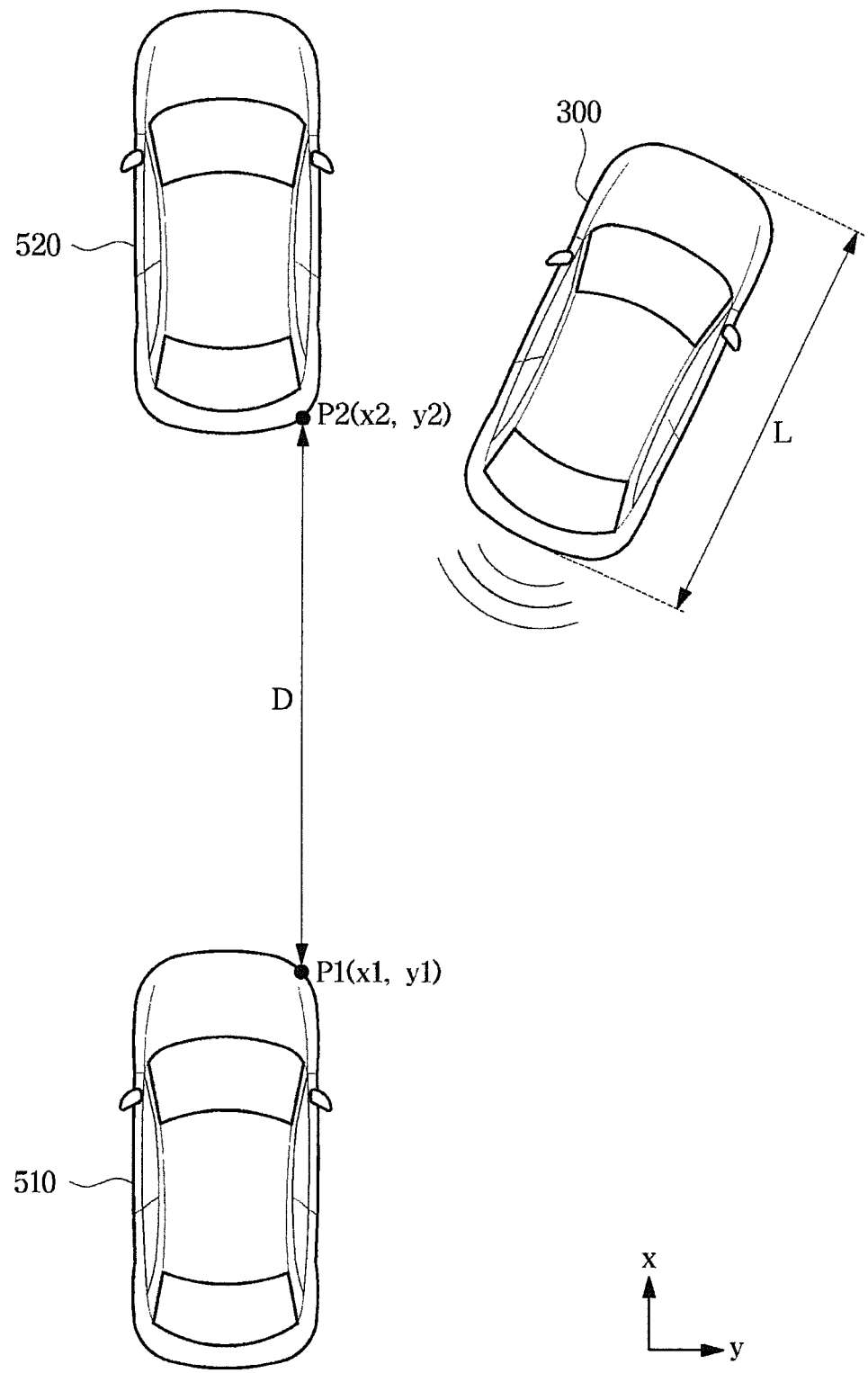
FIG. 10 is a view for describing an embodiment in which a parking space is recognized during longitudinal parking according to the disclosure.

FIG. 10 is a view for describing an embodiment in which a parking space is recognized during longitudinal parking according to the disclosure.

Referring to FIGS. 9 and 10, when the parking type is determined as the longitudinal parking, the controller 100 may calculate the first position coordinates P1 of the first vehicle 510 and the second position coordinates P2 of the second vehicle 520, as described above.

Next, the controller 100 may extract the specific component of each of the first position coordinates P1 and the second position coordinates P2, for example, x1 and x2, which are the x components, and calculate the difference value D corresponding to the difference between the x components.

Then, the controller 100 may compare the difference value D with the vehicle 300 corresponding to the parking type. For example, the controller 100 may compare the difference value D with a longitudinal length L of the vehicle 300 corresponding to the determined longitudinal parking.

When the difference value D is greater than the longitudinal length L the controller 100 may recognize the difference value D as the parking space and control the behavior of the vehicle 300 to park the vehicle 300 in the recognized parking space.

In this case, when the parking space is recognized, the controller 100 may determine that parking is completed when the entry rate of the vehicle 300 with respect to the recognized parking space is equal to or greater than the reference entry rate.

Meanwhile, there may be a case where parking is difficult because the obstacle exists in the recognized parking space. In this case as well, it is necessary to recognize the optimal parking space by comparing an interval between each of the other vehicles 510 and 520 and the obstacle.

Figure 11:
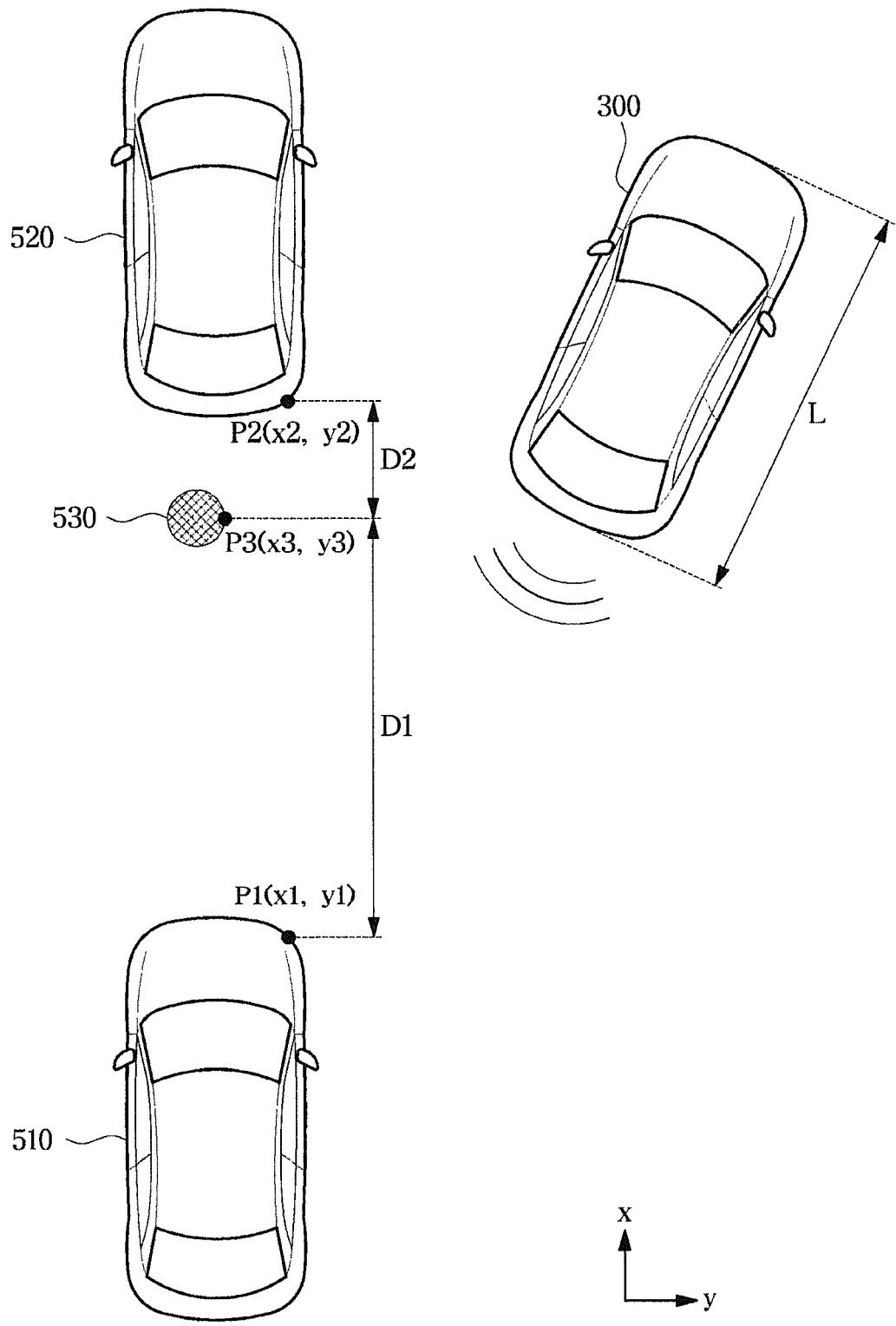
FIG. 11 is a view for describing another embodiment in which a parking space is recognized during longitudinal parking according to the disclosure.

FIG. 11 is a view for describing another embodiment in which a parking space is recognized during longitudinal parking according to the disclosure.

Referring to FIGS. 3 and 9 to 11, the controller 100 may determine the parking type as the longitudinal parking, and calculate the first position coordinates P1 of the first vehicle 510 and the second position coordinates P2 of the second vehicle 520. Since the detailed method is the same as the above-mentioned, it is omitted.

When there is the obstacle between the first vehicle 510 and the second vehicle 520, the sensor module 120, for example the ultrasonic sensor, disposed in the vehicle 300 may transmit the ultrasonic signal and receive the ultrasonic signal reflected from the obstacle 430 to detect the obstacle 530.

When the obstacle 530 between the two objects, for example, the first vehicle 510 and the second vehicle 520 is identified from the processing result of the detecting data, the controller 100 may calculate the third position coordinates P3 of the obstacle 530.

The controller 100 may extract x1 and x3, which are the x components of each of the first position coordinates P1 of the first vehicle 510 and the third position coordinates P3 of the obstacle 430, and calculate the first difference value D1 corresponds to the difference between the x components. In addition, the controller 100 may extract x2 and x3, which are the x components of each of the second position coordinates P2 of the second vehicle 520 and the third position coordinates P3 of the obstacle 530, and calculate the second difference value D2 corresponds to the difference between the x components.

Next, when the parking type is determined to be the longitudinal parking, the controller 100 may recognize the difference value larger than the longitudinal length L of the vehicle 300 as the parking space among the first difference value D1 and the second difference value D2.

For example, the controller 100 may recognize the first difference value D1 greater than the longitudinal length L of the vehicle 300 corresponding to the longitudinal parking among the first difference value D1 and the second difference value D2 as the parking space.

When the parking space is recognized, the controller 100 may control the behavior of the vehicle 300 to park the vehicle 300 in the parking space recognized as described above.

Figure 12:
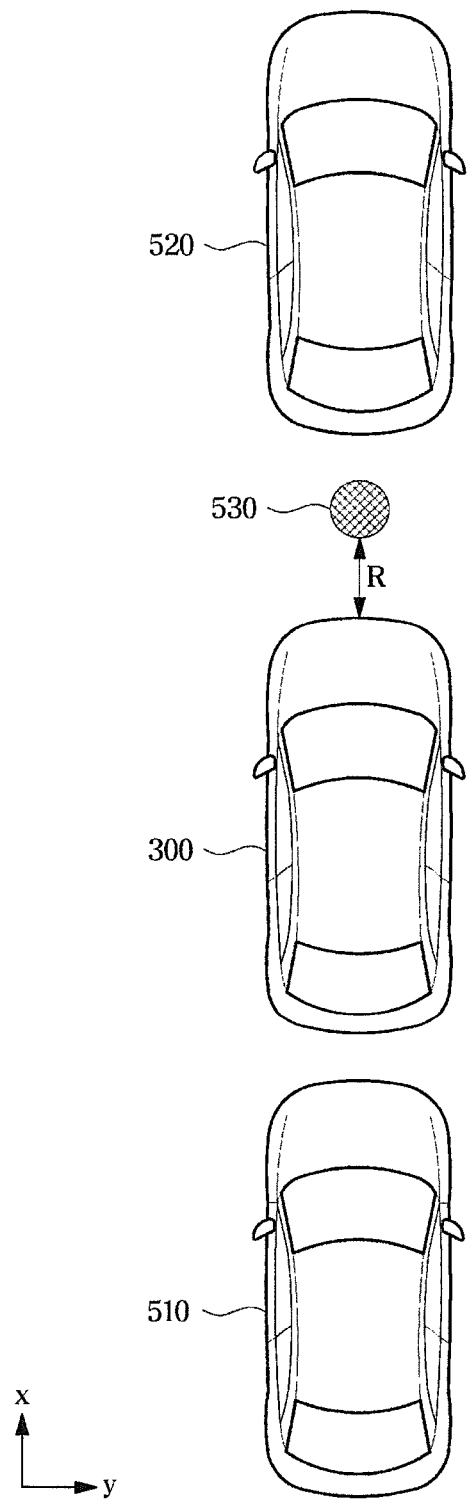
FIG. 12 is a view for describing embodiments in which longitudinal parking is completed according to the disclosure.

FIG. 12 is a view for describing embodiments in which longitudinal parking is completed according to the disclosure.

Referring to FIG. 12, when the parking space is recognized, the controller 100 may determine that parking is completed when the entry rate of the vehicle 300 with respect to the recognized parking space is equal to or greater than the preset reference entry rate, and the interval between the obstacle 530 and the vehicle 300 satisfies the preset reference interval.

For example, the controller 100 may recognize the first difference value D1 as the parking space, as illustrated in FIG. 11, and control the behavior of the vehicle 300 so that the vehicle 300 moves backward to the parking space corresponding to the first difference value D1. When the entry rate of the vehicle 300 with respect to the recognized parking space is 85% or more of the reference entry rate, and the interval between the obstacle 530 and the front of the vehicle 300 satisfies the reference interval R, the controller 100 may determine that parking in the recognized parking space is completed.

On the other hand, the passenger in the vehicle 300 by the obstacle 530 may feel uncomfortable to get off. In this case, the parking position different from that illustrated in FIG. 6 is required.

The controller 300 may select the parking space by receiving the parking space selection information similar to the above described with reference to FIGS. 7 and 8.

As described above, in the case of the longitudinal parking, the parking space may be recognized using the position coordinates of the object and the longitudinal length L of the vehicle 300. Hereinafter, embodiments related to the diagonal parking will be described.

Figure 13:
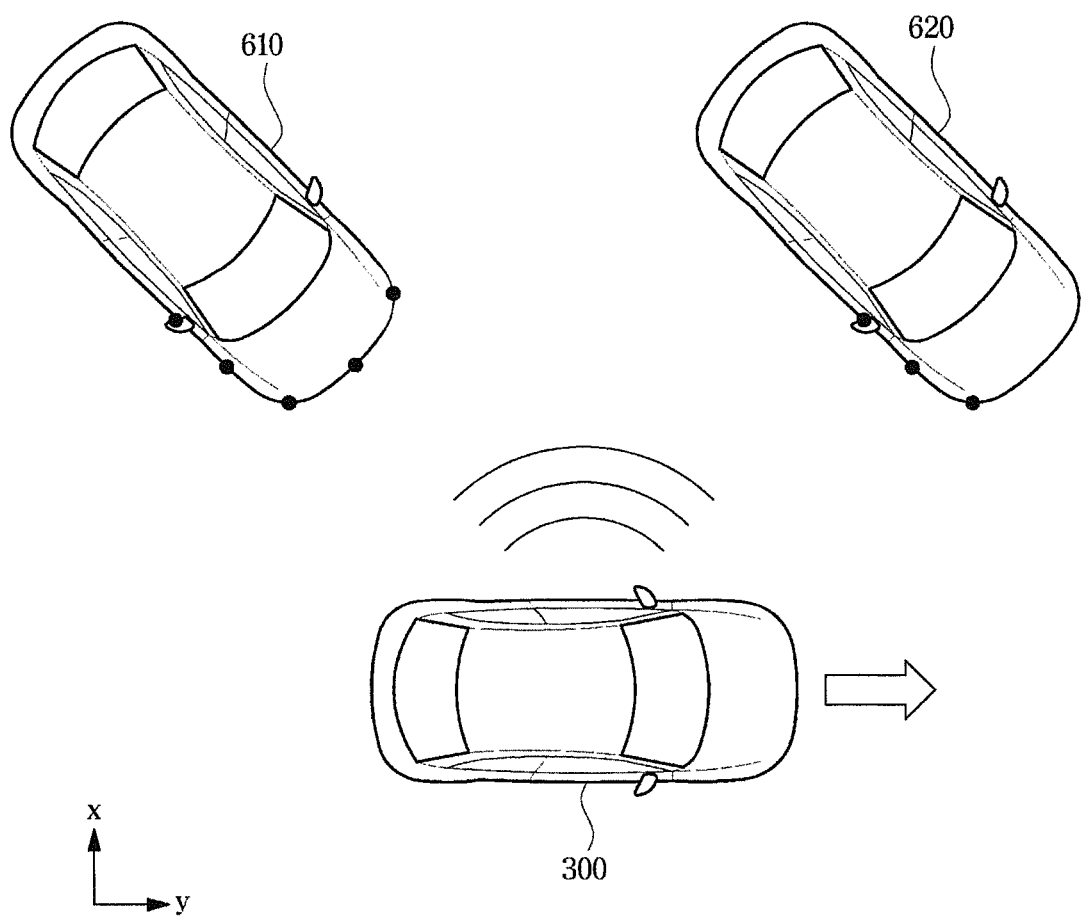
FIG. 13 is a view for describing embodiments in which diagonal parking is determined according to the disclosure.

FIG. 13 is a view for describing embodiments in which diagonal parking is determined according to the disclosure.

Referring to FIG. 13, the diagonal parking may refer to a case where each vehicle is parked at a constant twisted angle relative to the specific direction, for example, the x-axis direction.

Similar to those described above with reference to FIGS. 4 and 9, the sensor module 120 may detect the objects existing in the vicinity of the vehicle 300 while the vehicle 300 slows down in the specific direction, and the controller 100 may determine the parking type.

For example, the ultrasonic sensors included in the plurality of non-image sensor modules 120 may receive the plurality of ultrasonic signals reflected from a first vehicle 610 and a second vehicle 620 existing in the vicinity of the vehicle 300 while the vehicle 300 slows down in the y-axis direction. In addition, the controller 100 may identify the parking type of the first vehicle 610 and the second vehicle 620 based on the plurality of ultrasonic signals having different time of flight (TOF), and determine the parking type as the diagonal parking.

Figure 14:
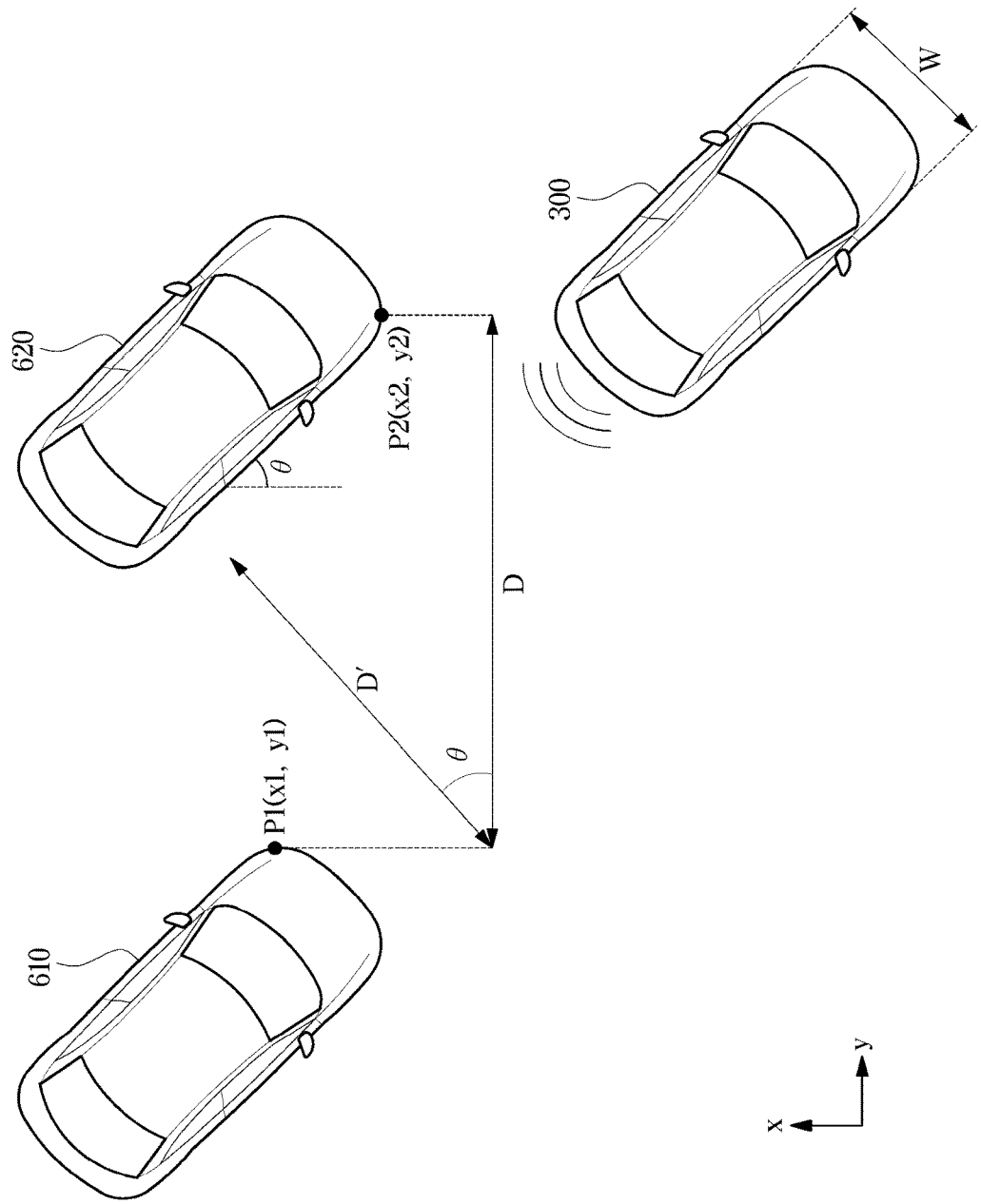
FIG. 14 is a view for describing an embodiment in which a parking space is recognized during diagonal parking according to the disclosure.

FIG. 14 is a view for describing an embodiment in which a parking space is recognized during diagonal parking according to the disclosure.

Referring to FIG. 14, when the controller 100 determines that the parking type is the diagonal parking, the controller 100 may calculate a parking angle between the vehicle 300 and the object from the processing result of the detecting data.

For example, the controller 100 may preset a reference direction in the x-axis direction, and calculate the parking angle $\theta$ between the vehicle 300 and the side surface of the second vehicle 620, that is, the second vehicle 620, based on the x-axis. Calculate the angle $\theta$.

When the parking angle $\theta$ is calculated, the controller 100 may compare a result value D' calculated by reflecting a value of a trigonometric function for the parking angle $\theta$ in the difference value D with the transverse length W of the vehicle 300 corresponding to the diagonal parking.

Particularly, the controller 100 extracts the specific components of each of the first position coordinates P1 of the first vehicle 610 and the second position coordinates P2 of the second vehicle 620, for example, y1 and y2, which are the y components, and calculate the difference value D corresponds to the difference between the y components. The controller 100 may calculate the result value D' by multiplying the difference value D. Then, the controller 100 may compare the result value D' with the transverse length W of the vehicle 300.

When the resultant value D' is greater than the transverse length W of the vehicle 300, the controller 100 may recognize the result value D' as the parking space and control the behavior of the vehicle 300 to park the vehicle 300 in the recognized parking space.

In the above description, the reference direction for calculating the parking angle and the value of the trigonometric function according thereto are merely for better understanding of the disclosure and are not limited to those illustrated in FIG. 14.

Meanwhile, there may be a case where parking is difficult because the obstacle exists in the recognized parking space. In this case as well, it is necessary to recognize the optimal parking space by comparing an interval between each of the other vehicles 610 and 620 and the obstacle.

Figure 15:
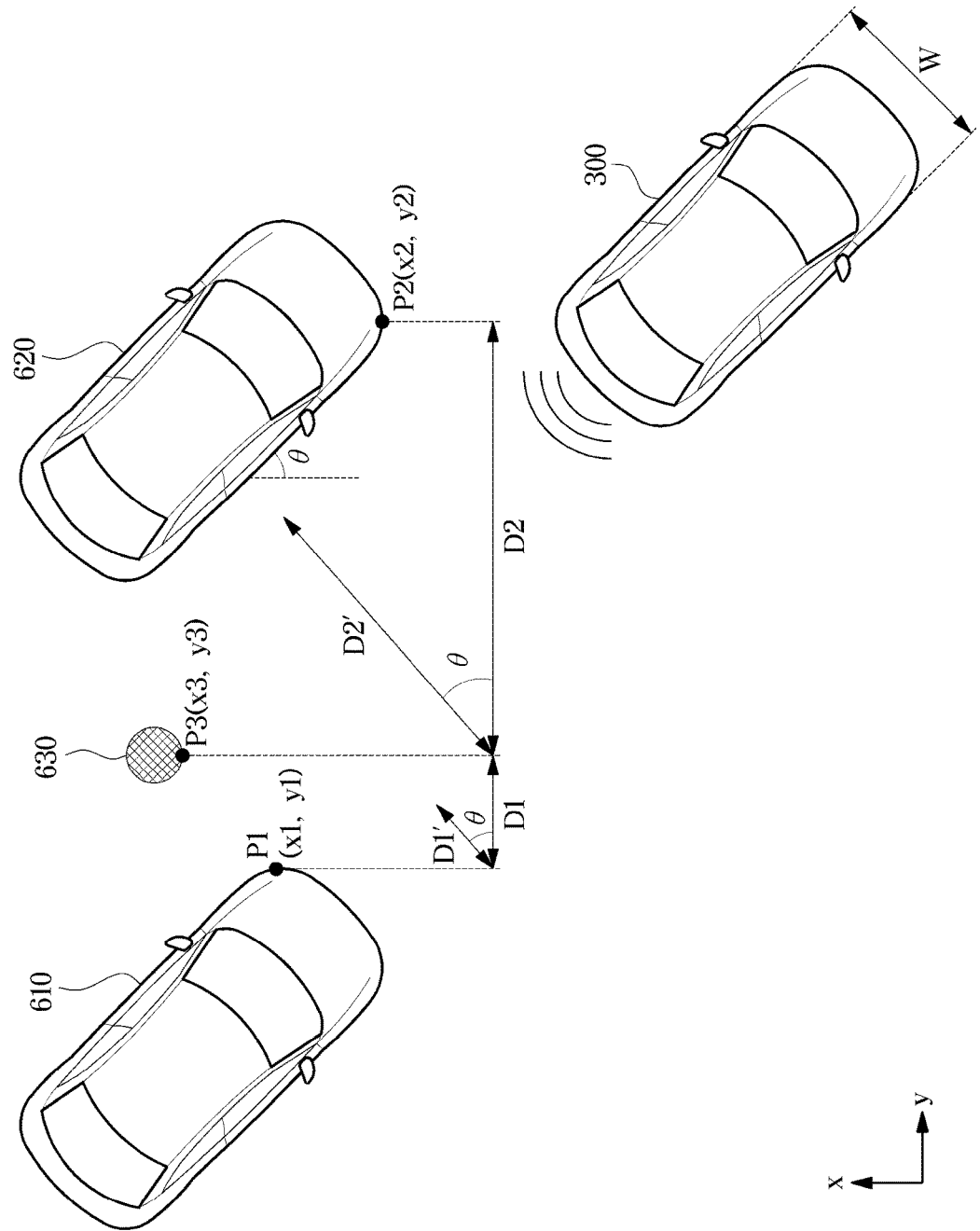
FIG. 15 is a view for describing another embodiment in which a parking space is recognized during diagonal parking according to the disclosure.

FIG. 15 is a view for describing another embodiment in which a parking space is recognized during diagonal parking according to the disclosure.

Referring to FIG. 15, when the obstacle 630 between the two objects, for example, the first vehicle 610 and the second vehicle 620 is identified from the processing result of the detecting data, the controller 100 may calculate the third position coordinates P3 of the obstacle 630.

When the third position coordinates P3 is calculated, the controller 100 may calculate a first result value calculated by reflecting the value of the trigonometric function for the parking angle to the first difference value between the first position coordinates of the first object of the two objects and the specific component of the position coordinates of the obstacle and a second result value calculated by reflecting the value of the trigonometric function for the parking angle to the second difference value between the second position coordinates of the second object of the two objects and the specific component of the position coordinates of the obstacle.

For example, the controller 100 may calculate the first difference value D1 using y1 and y3, which are the y components of each of the first position coordinates P1 of the first vehicle 610 and the third position coordinates P3 of the obstacle 630, and calculate a first difference value D1' calculated by multiplying a second difference value D2' calculated by multiplying the second difference value D2 calculated using y2 and y3, which are the y components of each of the second position coordinates P2 of the second vehicle 620 and the third position coordinates P3 of the obstacle 630 by cos θ.

Next, the controller 100 may recognize the result value larger than the transverse length W of the vehicle 300 among the first result value D1 'and the second result value D2' as the parking space.

For example, the second result D2', which is larger than the transverse length W of the vehicle 300, is recognized among the first result D1' and the second result D2' as the parking space.

When the parking space is recognized, the controller 100 may control the behavior of the vehicle 300 to park the vehicle 300 in the parking space recognized as described above.

Although not illustrated, when the parking space is recognized, the controller 100 may determine that parking is completed when the entry rate of the vehicle 300 with respect to the recognized parking space is equal to or greater than the preset reference entry rate, and the interval between the obstacle 630 and the vehicle 300 satisfies the preset reference interval.

Meanwhile, the above-described embodiments have been described using the sensor module 120, but may be implemented in the same manner as the above-described embodiment using the image sensor.

In addition, the above-described embodiments may be equally implemented using the DCU 200 implemented by a combination of the processor 130 and the controller 140.

Hereinafter, a vehicle control method capable of performing the disclosure will be described.

Figure 16:
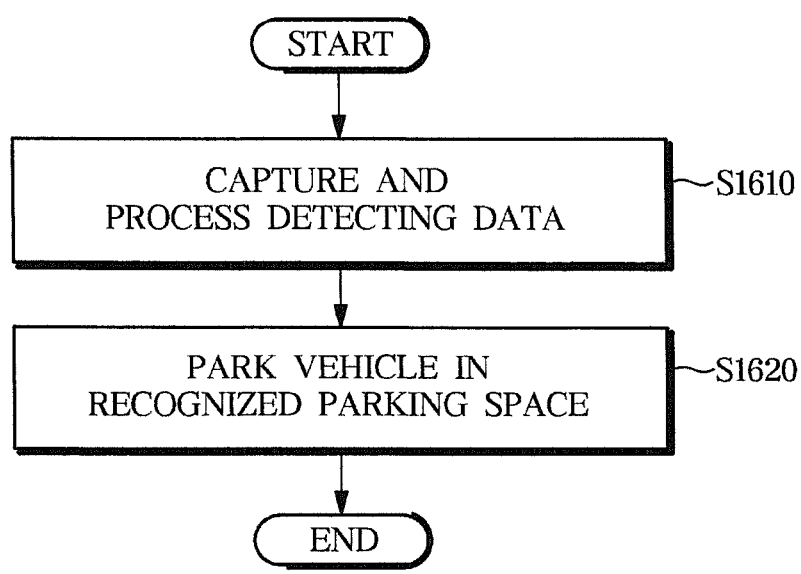
FIG. 16 is a flowchart illustrating a method of controlling a vehicle according to the disclosure.

FIG. 16 is a flowchart illustrating, a method of controlling a vehicle according to the disclosure.

Referring to FIG. 16, the vehicle control method may include operation S1610 of capturing the detecting data and processing the detected detecting data by at least one sensor module 120 disposed in the vehicle 300 to have the detecting area for the inside or the outside of the vehicle 300, operation S1620 of parking, by the controller 100, the vehicle 300 in the recognized parking space using the position coordinates of each of the at least two objects based at least in part on the processing of the detecting data, and the like.

Herein, in the operation S1620 of parking the vehicle 300, the parking type may be determined according to the state of at least two objects obtained by the processing result of the detecting data.

When the parking type is determined, the operation S1620 of parking the vehicle 300 may calculate the position coordinates of at least two objects, respectively, and calculate the difference value between the specific components among the position coordinates of at least two objects.

When the difference value is calculated, the operation S1620 of parking the vehicle 300 may compare the difference value with the length corresponding to the parking type of the preset length of the vehicle 300, and park the vehicle 300 in the recognized parking space by recognizing the difference value as the parking space when the difference value is greater than the length of the vehicle 300.

Figure 17:
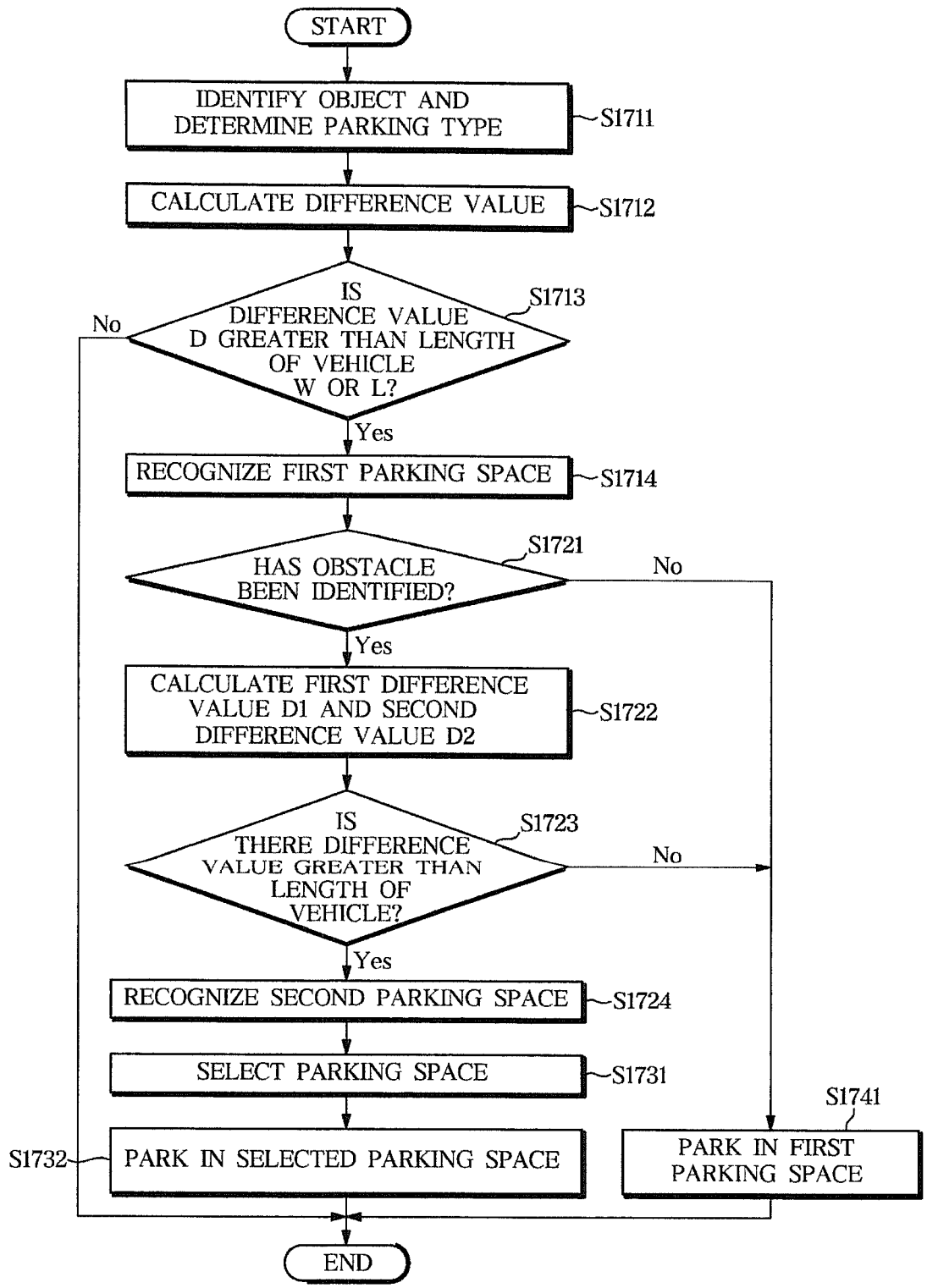
FIG. 17 is a flowchart illustrating a method of controlling a vehicle according to the disclosure in detail.

FIG. 17 is a flowchart illustrating a method of controlling a vehicle according to the disclosure in detail.

Referring to FIG. 17, the controller 100 may identify at least two objects obtained by the processing result of the detecting data captured by the sensor module 120 and determine the parking type according to the state of the object (S1711).

The controller 100 may calculate the difference value D for the specific component by using the position coordinates of at least two objects (S1712).

The controller 100 may compare the difference value D with the length of the vehicle 300 corresponding to the parking type (S1713).

For example, when the parking type is the perpendicular parking, the controller 100 may compare the difference value D with the transverse length W of the vehicle 300.

For another example, when the parking type is the longitudinal parking or the diagonal parking, the controller 100 may compare the difference value D with the longitudinal length L of the vehicle 300.

When the difference value D is smaller than the length of the vehicle 300, the controller 100 does not recognize the parking space and controls the vehicle 300 to notify the driver that parking is impossible.

When the difference value D is greater than the length of the vehicle 300, the controller 100 may recognize the difference value D as the first parking space (S1714).

The controller 100 may identify whether the obstacle exists between at least two objects (S1721).

When there is the obstacle, the controller 100 may calculate the first difference value D1 and the second difference value D2 (S1722).

For example, when there are two objects, the controller 100 may extract the specific component of each of the first position coordinates P1 of the first object and the third position coordinates P3 of the obstacle to calculate the first difference value D1 between the specific components. The controller 100 may extract the specific component of each of the second position coordinates P2 of the second object and the third position coordinates P3 of the obstacle to calculate the second difference value D2 between the specific components.

Next, the controller 100 may determine whether there is the difference value greater than the length of the vehicle 300 corresponding to the parking type, for example, the longitudinal length L or the transverse length W (S1723).

When there is the difference value greater than the length of the vehicle 300, the controller 100 may recognize the difference value as the second parking space (S1724).

The controller 100 may select the parking space based on whether the parking space selection information generated by the driver is received (S1731).

The controller 100 may control the behavior of the vehicle 300 to park the vehicle 300 in the selected parking space (S1732).

On the other hand, when there is no the obstacle or the difference value is smaller than the length of the vehicle 300, the controller 100 may control the behavior of the vehicle 300 to park the vehicle 300 in the first parking space (S1741).

According to an aspect of the disclosure as described above, it is possible to provide the vehicle control system that minimizes a frequency of performing control and increases a computation speed by quickly and accurately recognizing a parking space using position coordinates, and the method of controlling the vehicle.

In addition, according to another aspect of the disclosure, it is possible to provide the a parking controllable vehicle control system that provides driving convenience to the driver by recognizing the parking space between an obstacle and an object using the position coordinates, and the method of controlling the vehicle.

The description above and the accompanying drawings are merely illustrative of the technical spirit of the disclosure, and a person of ordinary skill in the art to which the disclosure pertains will be able to make various modifications and variations such as combining, separating, substituting and changing the configurations without departing from the essential characteristics of the disclosure. Accordingly, the disclosed embodiments are not intended to limit the technical spirit of the disclosure but to describe the scope of the technical spirit of the disclosure. That is, within the scope of the disclosure, all of the components may be operated in a selective combination with one or more. The protection scope of the disclosure should be interpreted by the following claims, and all technical ideas within the scope equivalent thereto shall be construed as being included in the scope of the disclosure.

What is claimed is:

1. A vehicle control system comprising:
a camera disposed in a vehicle to have a field of view of the inside or the outside of the vehicle, configured to capture image data and to process the captured image data;
at least one sensor disposed in a vehicle to have a detecting area for the inside or the outside of the vehicle, configured to capture detecting data and to process the captured detecting data; and
a controller configured to park the vehicle in a recognized parking space using position coordinates of each of at least two objects based at least in part on the processing of the image data and the detecting data, wherein the controller is configured to:
determine a parking type according to states of the at least two objects obtained from a processing result of the image data and the detecting data;
calculate the position coordinates of the at least two objects, respectively, by detecting a first object using the image data and the detecting data, after the first object is detected continuing to move and pass an area where no object is detected, detecting a second object using the image data and the detecting data, and calculating an undetected time;
calculate a difference value between specific components among the position coordinates of the at least two objects;
compare the difference value with a length corresponding to the parking type among preset lengths of the vehicle; and
when the difference value is larger than the length of the vehicle, recognize the difference value as the parking space and park the vehicle in the recognized parking space.

2. The vehicle control system according to claim 1, wherein the controller is configured to:
when the parking type is determined as perpendicular parking, compare the difference with a transverse length of the vehicle corresponding to the perpendicular parking; and
when the parking type is determined as longitudinal parking, compare the difference value with a longitudinal length of the vehicle corresponding to the longitudinal parking.

3. The vehicle control system according to claim 1, wherein the controller is configured to:
when an obstacle existing between the two objects is identified from the processing result of the image data and the detecting data, calculate the position coordinates of the obstacle;
calculate a first difference value between a first position coordinates of a first object of the two objects and the specific component of the position coordinates of the obstacle and a second difference value between a second position coordinates of a second object of the two objects and the specific component of the position coordinates of the obstacle; and
recognize a value greater than the preset length of the vehicle corresponding to the parking type of either the first difference value and the second difference value as the parking space.

4. The vehicle control system according to claim 3, wherein, when the parking type is determined as the perpendicular parking, the controller is configured to recognize the a value greater than the transverse length of the vehicle of either the first difference value and the second difference value as the parking space.

5. The vehicle control system according to claim 3, wherein, when the parking type is determined as the longitudinal parking, the controller is configured to recognize the value greater than the longitudinal length of the vehicle of either the first difference value and the second difference value as the parking space.

6. The vehicle control system according to claim 3, wherein, when the parking space is recognized, the controller is configured to determine that parking is completed when an entry rate of the vehicle with respect to the recognized parking space is equal to or greater than a preset reference entry rate, and an interval between the obstacle and the vehicle satisfies a preset reference interval.

7. The vehicle control system according to claim 3, wherein the controller is configured to:
determine whether parking space selection information is received; and
upon receiving the parking space selection information, select one of a recognized first parking space based on the position coordinates of the two objects based on the received parking space selection information and a recognized second parking space based on the value greater than the preset length of the vehicle corresponding to the parking type.

8. The vehicle control system according to claim 1, wherein the controller is configured to:
when the parking type is determined as the diagonal parking, calculate a parking angle between the vehicle and the object from the processing result of the image data and the detecting data; and
compare a result value calculated by multiplying a value of a trigonometric function for the parking angle in the difference value with a transverse length of the vehicle corresponding to the diagonal parking.

9. The vehicle control system according to claim 8, wherein the controller is configured to:
when the obstacle existing between the two objects is identified from the processing result of the image data and the detecting data, calculate the position coordinates of an obstacle;
calculate a first result value calculated by multiplying the value of the trigonometric function for the parking angle to the first difference value between the first position coordinates of the first object of the two objects and the specific component of the position coordinates of the obstacle and a second result value calculated by multiplying the value of the trigonometric function for the parking angle to the second difference value between the second position coordinates of the second object of the two objects and the specific component of the position coordinates of the obstacle; and recognize a result value larger than the transverse length of the vehicle among the first result value and the second result value as the parking space.

10. The vehicle control system according to claim 1, wherein, when the parking space is recognized, the controller is configured to determine that parking is completed when an entry rate of the vehicle with respect to the recognized parking space is equal to or greater than a preset reference entry rate.

11. A vehicle control system comprising:
a camera disposed in a vehicle to have a field of view of the inside or the outside of the vehicle, configured to capture image data;
at least one sensor disposed in the vehicle to have a detecting area for the inside or the outside of the vehicle, configured to capture detecting data;
at least one of driver assistance systems module configured to search for a parking space existing in the vicinity of the vehicle and to control a behavior of the vehicle for parking the vehicle in the parking space or departing the vehicle parked in the parking space; and
a domain controller configured to process the image data and the detecting data and to control at least one of the driver assistance systems included in the vehicle including a smart parking assistance system (SPAS),
wherein the DCU is configured to:
determine a parking type according to states of the at least two objects obtained from a processing result of the image data and the detecting data;
calculate the position coordinates of the at least two objects, respectively, by detecting a first object using the image data and the detecting data, after the first object is detected continuing to move and pass an area where no object is detected, detecting a second object using the image data and the detecting data, and calculating an undetected time;
calculate a difference value between specific components among the position coordinates of the at least two objects;
compare the difference value with a length corresponding to the parking type among preset lengths of the vehicle; and
when the difference value is larger than the length of the vehicle, recognize the difference value as the parking space and park the vehicle in the recognized parking space.

12. The vehicle control system according to claim 11, wherein the DCU is configured to:
when the parking type is determined as perpendicular parking, compare the difference with a transverse length of the vehicle corresponding to the perpendicular parking; and
when the parking type is determined as longitudinal parking, compare the difference value with a longitudinal length of the vehicle corresponding to the longitudinal parking.

13. The vehicle control system according to claim 11, wherein the DCU is configured to:
when an obstacle existing between the two objects is identified from the processing result of the image data and the detecting data, calculate the position coordinates of the obstacle;
calculate a first difference value between a first position coordinates of a first object of the two objects and the specific component of the position coordinates of the obstacle and a second difference value between a second position coordinates of a second object of the two objects and the specific component of the position coordinates of the obstacle; and
recognize a value greater than the preset length of the vehicle corresponding to the parking type of either the first difference value and the second difference value as the parking space.

14. The vehicle control system according to claim 13, wherein, when the parking type is determined as the perpendicular parking, the DCU is configured to recognize the value greater than the transverse length of the vehicle of either the first difference value and the second difference value as the parking space.

15. The vehicle control system according to claim 13, wherein, when the parking type is determined as the longitudinal parking, the DCU is configured to recognize the value greater than the longitudinal length of the vehicle of either the first difference value and the second difference value as the parking space.

16. The vehicle control system according to claim 13, wherein, when the parking space is recognized, the DCU is configured to determine that parking is completed when an entry rate of the vehicle with respect to the recognized parking space is equal to or greater than a preset reference entry rate, and an interval between the obstacle and the vehicle satisfies a preset reference interval.

17. The vehicle control system according to claim 13, wherein the DCU is configured to:
determine whether parking space selection information is received; and
upon receiving the parking space selection information, select one of a recognized first parking space based on the position coordinates of the two objects based on the received parking space selection information and a recognized second parking space based on the value greater than the preset length of the vehicle corresponding to the parking type.

18. The vehicle control system according to claim 11, wherein the DCU is configured to:
when the parking type is determined as the diagonal parking, calculate a parking angle between the vehicle and the object from the processing result of the image data and the detecting data; and
compare a result value calculated by multiplying a value of a trigonometric function for the parking angle in the difference value with a transverse length of the vehicle corresponding to the diagonal parking.

19. The vehicle control system according to claim 18, wherein the DCU is configured to:
when the obstacle existing between the two objects is identified from the processing result of the image data and the detecting data, calculate the position coordinates of an obstacle;
calculate a first result value calculated by multiplying the value of the trigonometric function for the parking angle to the first difference value between the first position coordinates of the first object of the two objects and the specific component of the position coordinates of the obstacle and a second result value calculated by multiplying the value of the trigonometric function for the parking angle to the second difference value between the second position coordinates of the second object of the two objects and the specific component of the position coordinates of the obstacle; and
recognize a result value larger than the transverse length of the vehicle among the first result value and the second result value as the parking space.

20. The vehicle control system according to claim 11, wherein, when the parking space is recognized, the DCU is configured to determine that parking is completed when an entry rate of the vehicle with respect to the recognized parking space is equal to or greater than a preset reference entry rate.

21. A method of controlling a vehicle comprising:

capturing, by a camera disposed in a vehicle to have a field of view of the inside or the outside of the vehicle, image data and processing the captured image data;

capturing, by at least one sensor disposed in the vehicle to have a detecting area for the inside or the outside of the vehicle, detecting data and processing the captured detecting data; and parking, by a controller, the vehicle in a recognized parking space using position coordinates of each of at least two objects based at least in part on the processing of the image data and the detecting data, wherein the parking of the vehicle comprises:

determining a parking type according to states of the at least two objects obtained from a processing result of the image data and the detecting data;

calculating the position coordinates of the at least two objects, respectively, by detecting a first object using the image data and the detecting data, after the first object is detected continuing to move and pass an area where no object is detected, detecting a second object using the image data and the detecting data and calculating an undetected time;

calculate a difference value between specific components among the position coordinates of the at least two objects;

comparing the difference value with a length corresponding to the parking type among preset lengths of the vehicle; and when the difference value is larger than the length of the vehicle, recognizing the difference value as the parking space and park the vehicle in the recognized parking space.

\* \* \* \* \*